US007600189B2

(12) United States Patent  (10) Patent No.: US 7,600,189 B2
Fujisawa  (45) Date of Patent: Oct. 6, 2009

(54) DISPLAY DEVICE, DISPLAY METHOD, AND PROGRAM

(75) Inventor: Hirotoshi Fujisawa, Kanagawa (JP)

(73) Assignee: Sony Corporation, Tokyo (JP)

(*) Notice: Subject to any disclaimer, the term of this patent is extended or adjusted under 35 U.S.C. 154(b) by 608 days.

(21) Appl. No.: 10/671,713

(22) Filed: Sep. 29, 2003

(65) Prior Publication Data

US 2004/0070620 A1    Apr. 15, 2004

(30) Foreign Application Priority Data

Oct. 11, 2002    (JP)    ............................ P2002-298293

(51) Int. Cl.
  *G06F 3/048*    (2006.01)
  *G06F 3/00*    (2006.01)
(52) U.S. Cl. ...................... 715/765; 715/788; 715/804; 715/805; 341/137; 345/2.2
(58) Field of Classification Search ................. 725/37, 725/50, 80, 81; 715/718, 707, 810, 812, 715/765, 788, 804, 805; 345/2.2, 2.3
See application file for complete search history.

(56) References Cited

U.S. PATENT DOCUMENTS

| | | | | |
|---|---|---|---|---|
| 4,458,266 A | * | 7/1984 | Mahoney | .................... 348/155 |
| 4,999,617 A | * | 3/1991 | Uemura et al. | ............... 345/156 |
| 5,415,251 A | * | 5/1995 | Akimoto | ...................... 186/49 |
| 5,469,183 A | * | 11/1995 | Takatsuji et al. | ............. 345/2.2 |
| 5,491,780 A | * | 2/1996 | Fyles et al. | .................. 715/733 |
| 5,508,713 A | * | 4/1996 | Okouchi | ...................... 345/2.2 |
| 5,513,264 A | * | 4/1996 | Wang et al. | .................... 380/51 |
| 5,612,524 A | * | 3/1997 | Sant'Anselmo et al. | ...... 235/494 |
| 5,621,879 A | * | 4/1997 | Kohda | ......................... 715/803 |
| 5,654,726 A | * | 8/1997 | Mima et al. | ................... 345/2.2 |
| 5,673,079 A | * | 9/1997 | Satoh | ......................... 348/14.1 |
| 5,726,669 A | * | 3/1998 | Obata et al. | ................... 345/2.2 |
| 5,742,260 A | * | 4/1998 | Fishman et al. | ............... 345/2.3 |
| 5,748,895 A | * | 5/1998 | Shiff et al. | .................... 713/100 |
| 5,764,277 A | * | 6/1998 | Loui et al. | ................ 348/14.01 |
| 5,774,357 A | * | 6/1998 | Hoffberg et al. | ............ 713/600 |
| 5,802,179 A | * | 9/1998 | Yamamoto | .................... 380/51 |
| 5,818,425 A | * | 10/1998 | Want et al. | ................... 345/158 |
| 5,831,664 A | * | 11/1998 | Wharton et al. | ............... 725/81 |

(Continued)

FOREIGN PATENT DOCUMENTS

JP    05-289840    11/1993

(Continued)

*Primary Examiner*—Steven B Theriault
(74) *Attorney, Agent, or Firm*—Rader, Fishman & Grauer PLLC; Christopher M. Tobin

(57) ABSTRACT

A display device that is capable of displaying predetermined display information in each of a plurality of display areas includes a setting unit for setting display control information that represents the position and size of the display area and the switching of the display information for when a predetermined event is detected, based on user inputs; and a display control unit for controlling one display including the multiple display areas such that the display information is displayed in each of the multiple display areas, based on the display control information set by the setting unit. Upon detection of the event, the display control unit switches the position or size of the display area where the display information for the detected event is displayed based on the display control information.

21 Claims, 22 Drawing Sheets

U.S. PATENT DOCUMENTS

| | | | | |
|---|---|---|---|---|
| 5,854,898 | A * | 12/1998 | Riddle | 709/231 |
| 5,867,156 | A * | 2/1999 | Beard et al. | 715/753 |
| 5,867,209 | A * | 2/1999 | Irie et al. | 348/14.15 |
| 5,900,868 | A * | 5/1999 | Duhault et al. | 725/42 |
| RE36,509 | E * | 1/2000 | Shigihara | 348/564 |
| 6,062,476 | A * | 5/2000 | Stern et al. | 235/462.35 |
| 6,064,303 | A * | 5/2000 | Klein et al. | 340/506 |
| 6,141,003 | A * | 10/2000 | Chor et al. | 715/719 |
| 6,152,369 | A * | 11/2000 | Wilz et al. | 235/462.01 |
| 6,191,758 | B1 * | 2/2001 | Lee | 345/2.2 |
| 6,202,212 | B1 * | 3/2001 | Sturgeon et al. | 725/141 |
| 6,211,847 | B1 * | 4/2001 | Jeong | 345/1.1 |
| 6,219,042 | B1 * | 4/2001 | Anderson et al. | 715/716 |
| 6,225,984 | B1 * | 5/2001 | Crawford | 345/173 |
| 6,281,820 | B1 * | 8/2001 | Fields | 341/137 |
| 6,348,933 | B1 * | 2/2002 | Walls et al. | 715/744 |
| 6,390,371 | B1 * | 5/2002 | Armga et al. | 235/472.01 |
| 6,417,869 | B1 * | 7/2002 | Do | 715/718 |
| 6,449,767 | B1 * | 9/2002 | Krapf et al. | 725/110 |
| 6,456,334 | B1 * | 9/2002 | Duhault | 348/565 |
| 6,459,442 | B1 * | 10/2002 | Edwards et al. | 715/863 |
| 6,466,241 | B1 * | 10/2002 | Schindler | 715/854 |
| 6,476,834 | B1 * | 11/2002 | Doval et al. | 715/863 |
| 6,483,906 | B1 * | 11/2002 | Iggulden et al. | 379/102.03 |
| 6,489,936 | B1 * | 12/2002 | Gormish | 345/2.1 |
| 6,496,122 | B2 * | 12/2002 | Sampsell | 340/825.69 |
| 6,526,577 | B1 * | 2/2003 | Knudson et al. | 725/40 |
| 6,535,240 | B2 * | 3/2003 | Yang et al. | 348/14.08 |
| 6,592,461 | B1 * | 7/2003 | Raviv et al. | 463/37 |
| 6,601,772 | B1 * | 8/2003 | Rubin et al. | 235/494 |
| 6,637,029 | B1 * | 10/2003 | Eilat et al. | 725/46 |
| 6,710,789 | B1 * | 3/2004 | Sekiguchi et al. | 715/781 |
| 6,724,373 | B1 * | 4/2004 | O'Neill et al. | 345/179 |
| 6,724,403 | B1 * | 4/2004 | Santoro et al. | 715/765 |
| 6,760,884 | B1 * | 7/2004 | Vertelney et al. | 715/202 |
| 6,766,382 | B1 * | 7/2004 | Madden et al. | 709/246 |
| 6,809,776 | B1 * | 10/2004 | Simpson | 348/565 |
| 6,859,937 | B1 * | 2/2005 | Narayan et al. | 725/37 |
| 6,877,027 | B1 * | 4/2005 | Spencer et al. | 709/205 |
| 6,879,997 | B1 * | 4/2005 | Ketola et al. | 709/208 |
| 6,882,712 | B1 * | 4/2005 | Iggulden et al. | 379/102.03 |
| 6,918,090 | B2 * | 7/2005 | Hesmer et al. | 715/760 |
| 6,918,132 | B2 * | 7/2005 | Gargi | 725/45 |
| 6,919,890 | B2 * | 7/2005 | Halstead, Jr. | 345/440 |
| 6,941,575 | B2 * | 9/2005 | Allen | 725/105 |
| 6,943,845 | B2 * | 9/2005 | Mizutome et al. | 348/555 |
| 6,993,554 | B2 * | 1/2006 | O'Donnell | 709/202 |
| 6,993,575 | B2 * | 1/2006 | Abkowitz et al. | 709/220 |
| 7,036,083 | B1 * | 4/2006 | Zenith | 715/758 |
| 7,047,092 | B2 * | 5/2006 | Wimsatt | 700/83 |
| 7,054,965 | B2 * | 5/2006 | Bell et al. | 710/72 |
| 7,068,294 | B2 * | 6/2006 | Kidney et al. | 715/700 |
| 7,106,298 | B1 * | 9/2006 | Turner et al. | 345/156 |
| 7,176,848 | B1 * | 2/2007 | Dai et al. | 345/2.2 |
| 7,190,336 | B2 * | 3/2007 | Fujisawa | 345/81 |
| 7,197,715 | B1 * | 3/2007 | Valeria | 715/747 |
| 7,199,787 | B2 * | 4/2007 | Lee et al. | 345/169 |
| 7,200,801 | B2 * | 4/2007 | Agassi et al. | 715/202 |
| 7,225,456 | B2 * | 5/2007 | Kitsukawa et al. | 725/43 |
| 7,231,603 | B2 * | 6/2007 | Matsumoto | 715/716 |
| 7,275,212 | B2 * | 9/2007 | Leichtling | 715/733 |
| 7,303,471 | B2 * | 12/2007 | Gilton | 463/39 |
| 7,328,846 | B2 * | 2/2008 | Harada | 235/459 |
| 7,369,099 | B2 * | 5/2008 | Arai et al. | 345/1.1 |
| 2001/0038394 | A1 * | 11/2001 | Tsuchimura et al. | 345/811 |
| 2001/0049720 | A1 * | 12/2001 | Eyer | 709/203 |
| 2002/0030105 | A1 * | 3/2002 | Miller et al. | 235/462.13 |
| 2002/0032701 | A1 * | 3/2002 | Gao et al. | 707/513 |
| 2002/0055959 | A1 * | 5/2002 | Hayashi | 707/517 |
| 2002/0067376 | A1 * | 6/2002 | Martin et al. | 345/810 |
| 2002/0073178 | A1 * | 6/2002 | Jalili | 709/219 |
| 2002/0078447 | A1 * | 6/2002 | Mizutome et al. | 725/37 |
| 2002/0124071 | A1 * | 9/2002 | Proehl et al. | 709/223 |
| 2002/0152462 | A1 * | 10/2002 | Hoch et al. | 725/37 |
| 2002/0169893 | A1 * | 11/2002 | Chen et al. | 709/248 |
| 2002/0188663 | A1 * | 12/2002 | Islam et al. | 709/202 |
| 2002/0194595 | A1 * | 12/2002 | Miller et al. | 725/36 |
| 2003/0001016 | A1 * | 1/2003 | Fraier et al. | 235/462.03 |
| 2003/0084456 | A1 * | 5/2003 | Ryan et al. | 725/113 |
| 2003/0093789 | A1 * | 5/2003 | Zimmerman et al. | 725/34 |
| 2003/0229900 | A1 * | 12/2003 | Reisman | 725/87 |
| 2003/0231259 | A1 * | 12/2003 | Yui et al. | 348/564 |
| 2004/0012540 | A1 * | 1/2004 | Treibitz et al. | 345/2.2 |
| 2004/0153508 | A1 * | 8/2004 | Alcorn et al. | 709/205 |
| 2004/0268413 | A1 * | 12/2004 | Reid et al. | 725/131 |
| 2005/0036036 | A1 * | 2/2005 | Stevenson et al. | 348/211.99 |
| 2005/0081155 | A1 * | 4/2005 | Martin et al. | 715/719 |
| 2005/0178833 | A1 * | 8/2005 | Kisliakov | 235/441 |

FOREIGN PATENT DOCUMENTS

| | | |
|---|---|---|
| JP | 06-282396 | 10/1994 |

* cited by examiner

FIG. 5

| DISPLAY CATEGORY | DISPLAY TARGET | | | DISPLAY SETTING |
|---|---|---|---|---|
| | 1CH | 2CH | 3CH | |
| TV PROGRAM | | | | DISPLAY TV PROGRAM |
| INFORMATION OF INTEREST | INVESTMENT INFORMATION | RESTAURANT GUIDE | | SPECIFY URL OR DISPLAY INFORMATION ACQUIRED FROM SOURCE CODE OF URL |
| MAIL | A | B | | UPDATE DISPLAY UPON RECEPTION OF NEW EMAIL |
| SCHOOL SITUATION | CLASS ROOM | SCHOOLYARD | | PICTURES IN NURSERY |
| TRAFFIC INFORMATION | LINE A | EXPRESS LINE B | | SPECIFY URL OR DISPLAY INFORMATION ACQUIRED FROM SOURCE CODE OF URL |
| SECURITY | FRONT DOOR | BACK DOOR | | PICTURES PHOTOGRAPHED BY SURVEILLANCE CAMERA |
| WEATHER INFORMATION | CITY A | HURRICANE INFORMATION | | SPECIFY URL OR DISPLAY INFORMATION ACQUIRED FROM SOURCE CODE OF URL |

FIG. 6

| DISPLAY CATEGORY | | LAYOUT | | |
|---|---|---|---|---|
| | | COORDINATE VALUES OF CENTER | AREA SIZE | FONT SIZE |
| TV PROGRAM | 1CH | (50, 25) | 50 | |
| | 2CH | (45, 70) | 20 | |
| | 3CH | (55, 70) | 20 | |
| INFORMATION OF INTEREST | INVESTMENT INFORMATION | (90, 25) | 20 | 15 |
| | RESTAURANT GUIDE | (90, 65) | 20 | 15 |
| MAIL | A | (10, 5) | 20 | 12 |
| | B | (10, 25) | 20 | 12 |
| SCHOOL SITUATION | CLASS ROOM | (10, 50) | 20 | |
| | SCHOOLYARD | (10, 70) | 20 | |
| TRAFFIC INFORMATION | LINE A | ( 8, 95) | 20 | 10 |
| | EXPRESS LINE B | (25, 95) | 20 | 10 |
| SECURITY | FRONT DOOR | (48, 95) | 20 | |
| | BACK DOOR | (52, 95) | 20 | |
| WEATHER INFORMATION | CITY A | (180, 25) | 20 | 10 |
| | HURRICANE INFORMATION | (92, 25) | 20 | 10 |

FIG. 8

| DISPLAY CATEGORY | | IP ADDRESS OF SITE LINKED TO | LINK SETTING |
|---|---|---|---|
| TV PROGRAM | | | |
| INFORMATION OF INTEREST | 1 | 192.168.0.255 (DISPLAY OF MR. BROWN) | BOTH "DISPLAY" AND "OPERATION" |
| | 2 | | |
| MAIL | | | |
| SCHOOL SITUATION | | | |
| TRAFFIC INFORMATION | | | |
| SECURITY | | | |
| WEATHER INFORMATION | | | |

FIG. 10

| DISPLAY CATEGORY | EVENT CONDITION | DISPLAY-SWITCHING SETTING (LAYOUT CHANGE) |
|---|---|---|
| TV PROGRAM | SHOUTING IN TV PROGRAM (1CH) | ENLARGE TO FULL SIZE OF VARIABLE AREA |
| INFORMATION OF INTEREST | | |
| MAIL | EMAIL INCLUDING IMAGES RECEIVED | REPLACE WITH TV PROGRAM (2CH) |
| SCHOOL SITUATION (RELAY FROM NURSERY) | LUNCH TIME FOR CHILDREN | REPLACE WITH TV PROGRAM (1CH) |
| TRAFFIC INFORMATION | | |
| SECURITY | SUSPICIOUS PERSON DETECTED AT FRONT DOOR | ENLARGE TO FULL SIZE OF DISPLAY |
| WEATHER INFORMATION | | |

FIG. 15

| DISPLAY CATEGORY | | CG REPRESENTATION | DISPLAY SETTING |
|---|---|---|---|
| TV PROGRAM | | HANDLING IN CG APPLICATION | FULL-TIME DISPLAY, AUTOMATIC SCREEN |
| INFORMATION OF INTEREST | 1 | HANDLING IN CG APPLICATION | PART-TIME DISPLAY, AUTOMATIC SCREEN |
| | 2 | HANDLING IN CG APPLICATION | PART-TIME DISPLAY, AUTOMATIC SCREEN |
| MAIL | | | |
| SCHOOL SITUATION | | | |
| TRAFFIC INFORMATION | | | |
| SECURITY | | | |
| WEATHER INFORMATION | | | |

FIG. 18

| HOUSE | SCHOOL (UNIVERSITY) | OFFICE | STORE (DEPARTMENT STORE) | HOSPITAL (GENERAL HOSPITAL) |
|---|---|---|---|---|
| LOCAL INFORMATION (STATE, CITY) | NOTICE FROM INSTRUCTOR | TO-DO LIST | EVENT INFORMATION | GENERAL INFORMATION |
| WEATHER INFORMATION | NOTICE FROM SECRETARIAT | FOLLOW-UP | SALES INFORMATION | WAITING STATE IN EACH DEPARTMENT |
| SCHOOL INFORMATION (RELAY) | NOTICE FROM CLUB | WEEKLY SCHEDULE | RELAY FROM EACH FLOOR | GUIDE TO CONSULTATION PROCESS |
| BULLETIN | WEATHER INFORMATION | MAIL | ANNOUNCEMENT OF LOST CHILD | INFORMATION ON DOCTOR IN ATTENDANCE |
| COMMUNITY | TRAFFIC INFORMATION | INDUSTRY NEWS | ANNOUNCEMENT FROM DINING ROOM | TRAFFIC INFORMATION |
| TRAFFIC INFORMATION | REFECTORY INFORMATION (RELAY) | TRAFFIC INFORMATION | TRAFFIC INFORMATION | WEATHER INFORMATION |
| SECURITY (SURVEILLANCE CAMERA) | ADVERTISEMENT ISSUED FROM NEIGHBORING STORE | EVENT INFORMATION | WEATHER INFORMATION | |
| INFORMATION OF INTEREST | | WEATHER INFORMATION | GUIDE TO BREAK ROOM | |
| TV PROGRAM INFORMATION | | IDLE INFORMATION OF CONFERENCE ROOM | | |
| EMAIL INFORMATION | | SECURITY | | |

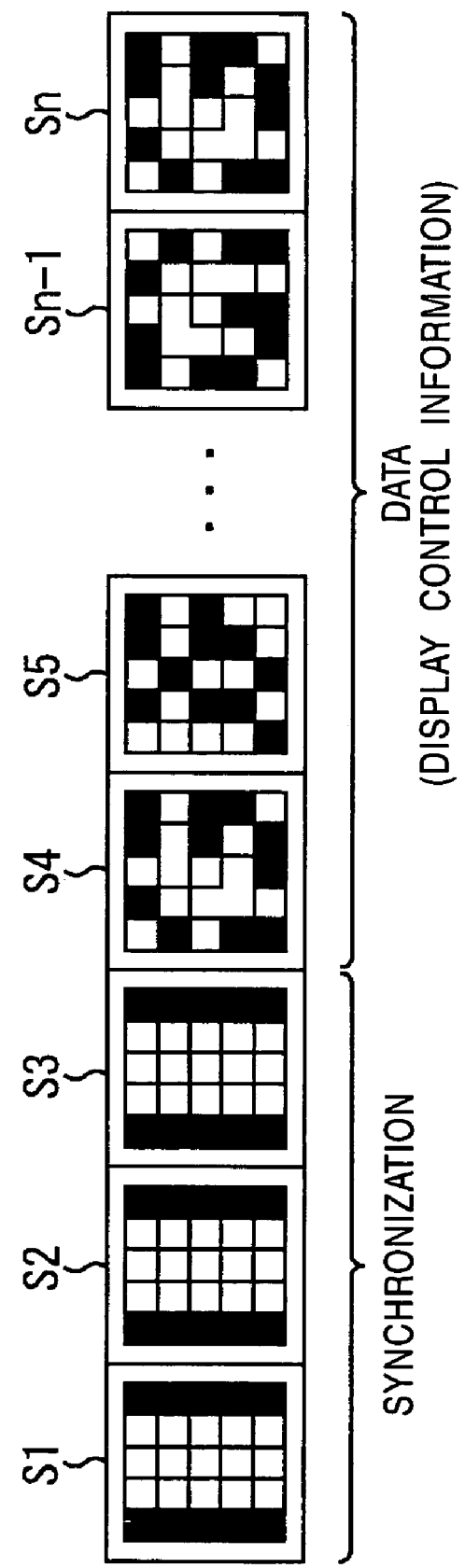

DISPLAY DEVICE, DISPLAY METHOD, AND PROGRAM

BACKGROUND OF THE INVENTION

1. Field of the Invention

The present invention relates to display devices, display methods, and programs and, more particularly, to a display device, a display method, and a program, which are capable of presenting preferred information in accordance with user preferences.

2. Description of the Related Art

In recent years, with the increase in size of liquid crystal displays (LCDs) and plasma display panels (PDPs) and the development of communication technology, not only TV programs but also various pictures downloaded over the Internet or an in-house local area network (LAN) have come to be viewed on such displays.

This allows, for example, pictures that are photographed by a camera mounted at a remote site and downloaded over the Internet and pictures stored on a personal computer to be centrally managed and viewed regardless of their sources.

In order for a user to conveniently and efficiently view such pictures with a variety of information on one display, it is indispensable to set the display position and display size of the information.

Technologies for setting the display position and the like on displays are disclosed in the following patent documents.

Patent Document 1 (Japanese Unexamined Patent Application Publication No. 5-289840, pages 5 and 6, FIGS. 8 and 9) discloses a technology in which a user can set the content and the display position of information displayed in each of a plurality of windows on a screen.

Patent Document 2 (Japanese Unexamined Patent Application Publication No. 6-282396, pages 3 to 5, FIGS. 2 and 3) discloses a technology in which a user can customize the display representing, for example, the position where an event occurs without altering the application.

However, with the technologies disclosed in Patent Documents 1 and 2, there is a problem in that the setting of the display position or the display size of information cannot be switched to another size or position upon the occurrence of a predetermined event; and, therefore, the user is not made aware of the occurrence of the event.

SUMMARY OF THE INVENTION

Accordingly, it is an object of the present invention to provide a display device, a display method, and a program that are capable of offering information in accordance with user preferences so that the user can efficiently and quickly be made aware of an occurrence of an event.

The present invention provides, in its first aspect, a display device that is capable of displaying predetermined display information in each of a plurality of display areas. The display device includes a setting unit for setting display control information that represents the position and size of the display area and the switching of the display information for when a predetermined event is detected, based on user inputs, and a display control unit for controlling one display, including the multiple display areas, such that the display information is displayed in each of the multiple display areas based on the display control information set by the setting unit. Upon detection of the event, the display control unit switches the position or size of the display area where the display information for the detected event is displayed based on the display control information.

The setting unit may set information representing the priority of the display information as the display control information. The display control unit may control the position and size of the display area in accordance with the information representing the priority.

The setting unit may set, as the display control information, the information representing a link item that another display device uses to display the display information displayed in the display area.

Upon detection of a sound volume exceeding a predetermined threshold value as the event in a program that is displayed in the display areas as the display control information, the display control unit may control the position or size of the display area where the program is displayed.

Upon reception of an email as the event, the display control unit may control the position or size of the display area where the display information concerning the email is displayed.

The display control unit may control the position or size of the display area at a predetermined time of day as the event.

Upon detection of a person as the event in a picture displayed in the display areas, the display control unit may control the position or size of the display area where the picture is displayed.

The display device may further include a generating unit for generating a plurality of symbols representing the display control information. The display control unit sequentially displays as the display control information each of the multiple symbols that is generated by the generating unit.

The display device may include a detecting unit for detecting the symbol each time the multiple symbols, representing the display control information, are sequentially displayed in another display device as the display information and an acquiring unit for acquiring the display control information based on the multiple symbols detected by the detecting unit.

The present invention provides, in its second aspect, a display method of a display device that is capable of displaying predetermined display information in each of a plurality of display areas. The display method includes the step of setting display control information that represents the position and size of the display area and the switching of the display information for when a predetermined event is detected, based on user inputs, and the step of controlling one display including the multiple display areas such that the display information is displayed in each of the multiple display areas, based on the display control information set in the setting step. Upon detection of the event, the position or size of the display area where the display information for the detected event is displayed is switched based on the display control information in the controlling step.

The present invention provides, in its third aspect, a program that causes a computer to execute a display process for displaying predetermined display information in each of a plurality of display areas. The program includes the step of setting display control information that represents the position and size of the display area and the switching of the display information for when a predetermined event is detected, based on user inputs, and the step of controlling one display including the multiple display areas such that the display information is displayed in each of the multiple display areas, based on the display control information set in the setting step. Upon detection of the event, the position or size of the display area where the display information for the detected event is displayed is switched based on the display control information in the controlling step.

With the display device, the display method, and the program according to the present invention, the display control information that represents the position and size of the display area and the switching of the display information for when a predetermined event is detected is set based on user inputs. One display including the multiple display areas is provided and controlled such that the display information is displayed in each of the multiple display areas, based on the display control information that is set. Upon detection of the event, the position or size of the display area where the display information for the detected event is displayed is switched based on the display control information.

According to the present invention, a variety of information can be offered in an optimal environment that suits the user preferences.

Furthermore, according to the present invention, the user can efficiently and quickly become aware of an occurrence of an event.

The above and other objects, features, and advantages of the present invention will become clear from the following description of the preferred embodiments taken in conjunction with the attached drawings.

BRIEF DESCRIPTION OF THE DRAWINGS

FIG. 5 is a table showing examples of the display control information;

FIG. 6 is a table showing other examples of the display control information;

FIG. 8 is a table showing other examples of the display control information;

FIG. 10 is a table showing other examples of the display control information;

FIG. 15 is a table showing other examples of the display control information;

FIG. 18 is a table showing examples of the location where the display device is mounted and of the displayed information in the respective locations;

FIG. 26 is a diagram showing an example of a symbol array.

DESCRIPTION OF THE PREFERRED EMBODIMENTS

Figure 1:
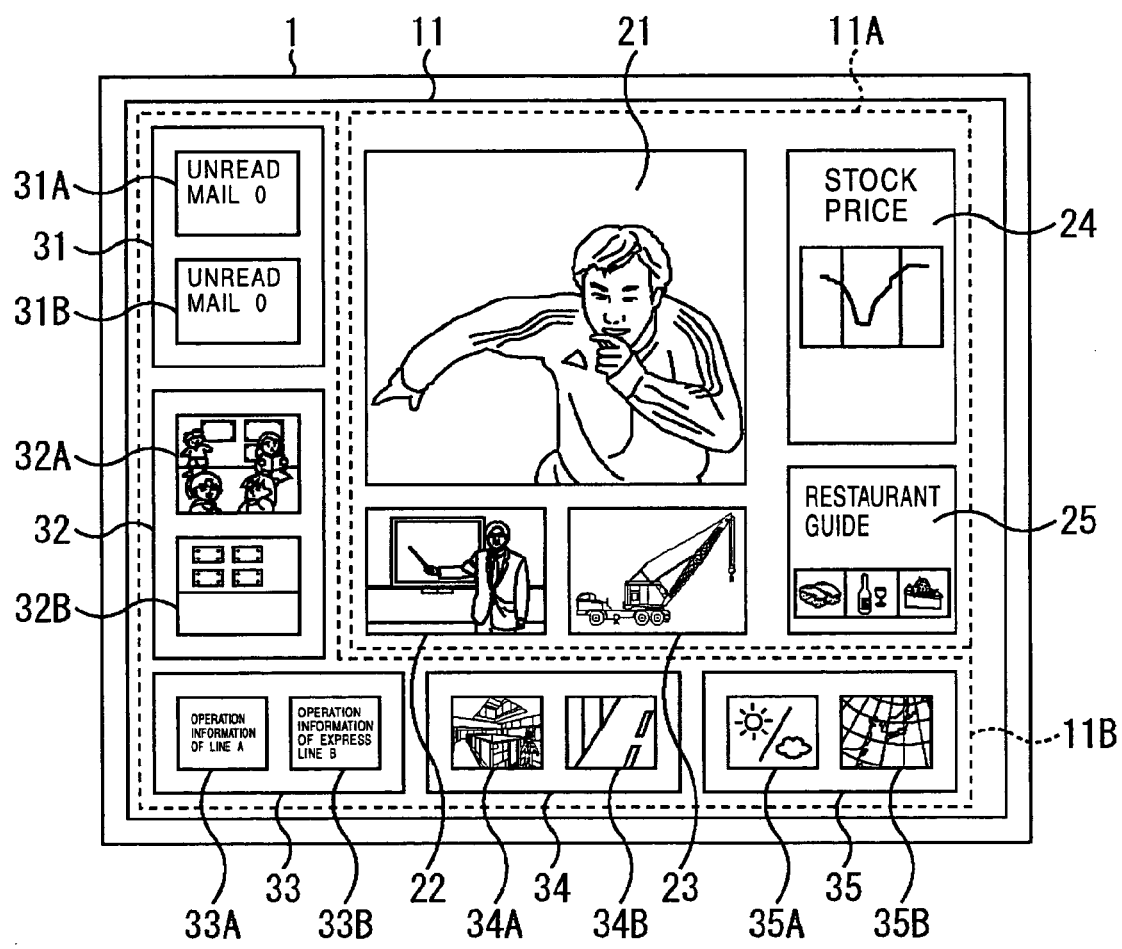
FIG. 1 is an external view showing a structural example of a display device according to the present invention.

FIG. 1 is an external view showing a structural example of a display device 1 according to the present invention.

Referring to FIG. 1, a display 11 is formed over the entire front face of the display device 1. The display 11 is, for example, an organic or inorganic electroluminescence (EL) display or a liquid crystal display (LCD), in which a thin film transistor (TFT) is provided for every pixel. The display 11 controls the driving for all pixels and displays images, such as certain graphics or characters.

The display 11 includes a variable area 11A and a fixed area 11B, as shown by broken lines in FIG. 1. In the variable area 11A, the display size or display position of a variety of information (images) is switched in accordance with the current situation or user preferences. In the fixed area 11B, the display size or the like of information is not switched and therefore is fixed even if a certain event is detected.

The broken lines in FIG. 1 showing the ranges of the variable area 11A and the fixed area 11B may be not displayed on a screen and may be unable to be visualized by a user.

Information of various categories is displayed on the display 11. In the structural example in FIG. 1, pictures of TV programs broadcast on different channels are displayed in areas 21 to 23 in the variable area 11A. Information of interest downloaded over the Internet or the like is displayed in areas 24 and 25 in the variable area 11A.

An area 31 in the fixed area 11B is an area where messages notifying the reception or non-reception of email, which are generated by a program for controlling the email, are displayed. An area 32 in the fixed area 11B is an area where pictures that are sent from cameras mounted at remote sites are displayed. Specifically, the area 31 is divided into two subareas 31A and 31B in accordance with the number of users of the display device 1. The messages notifying the non-reception of email are displayed in the respective subareas 31A and 31B. The pictures that are sent from cameras mounted at different sites are displayed in the respective subareas 32A and 32B in the area 32.

An area 33 is an area where traffic information is displayed. The operation information of a line A is displayed as the traffic information in a subarea 33A in the area 33 and the operation information of an express line B is displayed as the traffic information in a subarea 33B in the area 33. An area 34 is an area where pictures that are sent from surveillance cameras mounted at outdoor places or the like are displayed. The pictures that are sent from surveillance cameras mounted at different sites are displayed in the respective subareas 34A and 34B in the area 34. An area 35 is an area where weather information is displayed. Symbols showing the weather forecast at a region that is set by a user are displayed in a subarea 35A in the area 35 and a national weather map is displayed in a subarea 35B in the area 35.

As described above, the display device 1 not only displays pictures of TV programs but also displays information of various categories (display information) that is distributed from different sources, in accordance with user preferences.

The information displayed on the display device 1 changes its display position or display size in accordance with the situation. For example, when a sound volume exceeding a predetermined threshold value is detected in a TV program displayed in the area 21, the area 21 is extended and therefore the pictures of the TV program are displayed over the entire variable area 11A.

For example, when an email is received, the display content in the subarea 31A where information concerning an email has been displayed are replaced with the display content in the area 22 and a message notifying the reception of the email is displayed in the area 22 in FIG. 1.

In this manner, information to which a user is alerted, that is, information having higher priority is displayed in a position or size that is highly visible for the user. Triggers for display switching, such as the sound volume of a TV program exceeding a threshold value or the reception of an email, are hereinafter referred to as "events".

Figure 2:
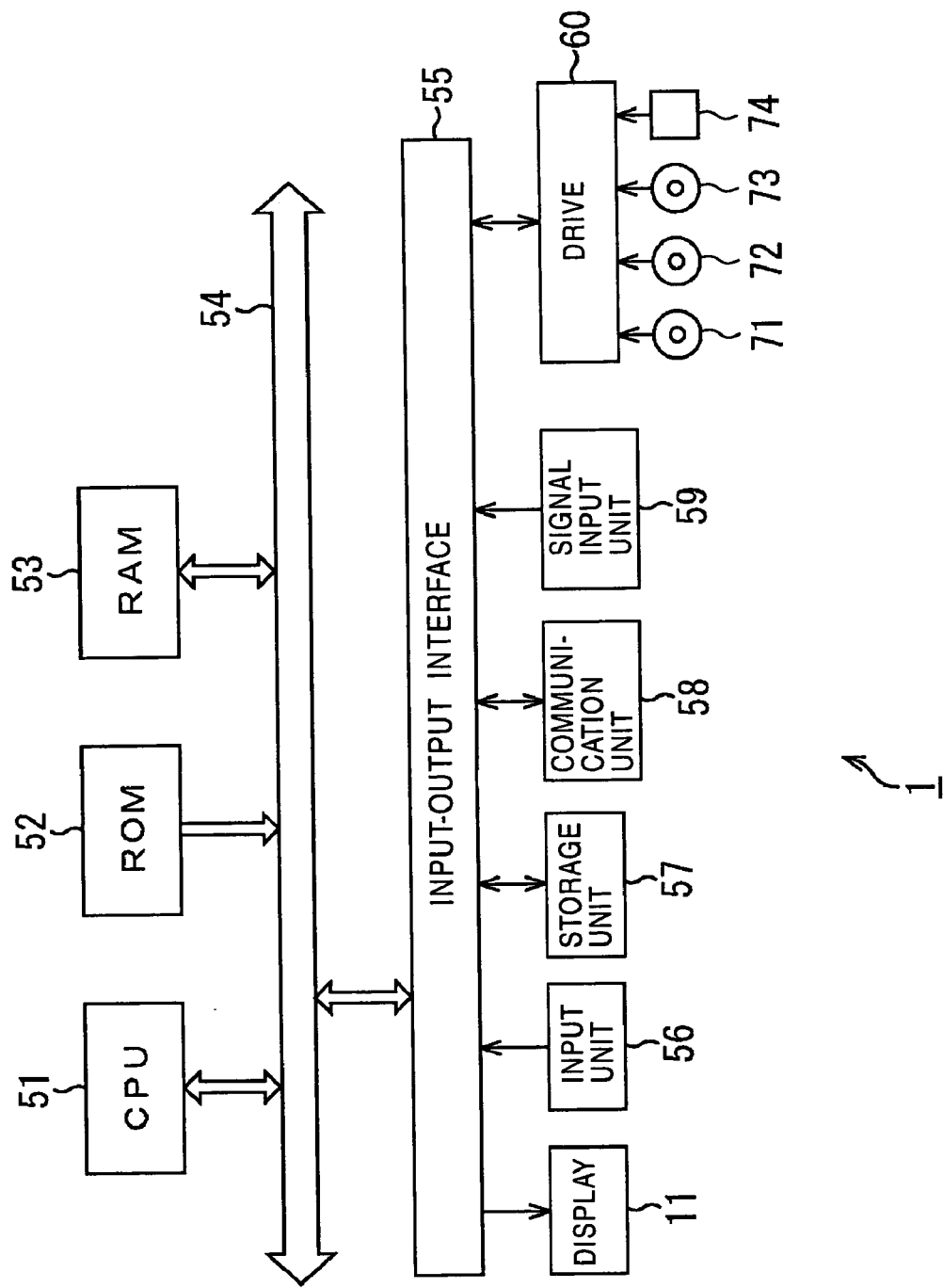
FIG. 2 is a block diagram showing an internal structural example of the display device in FIG. 1.

FIG. 2 is a block diagram showing an internal structural example of the display device 1 in FIG. 1.

Referring to FIG. 2, a central processing unit (CPU) 51 executes various processes in accordance with programs stored in a read-only memory (ROM) 52 or programs loaded in a random access memory (RAM) 53 from a storage unit 57. The RAM 53 also stores data that is necessary for the CPU 51 to execute the various processes.

The CPU 51, the ROM 52, and the RAM 53 are connected to each other through a bus 54. An input-output interface 55 is also connected to the bus 54.

The display unit 11, such as an organic or inorganic EL display or an LCD, in which a TFT is provided for every pixel, an input unit 56 for detecting the infrared light emitted from a remote controller and receiving the input by the user, and the storage unit 57, that is, for example, a hard disk or a flash memory, are connected to the input-output interface 55.

A communication unit 58 for communicating with various devices over a network such as the Internet or over a local area network (LAN) built in an indoor place where the display device 1 is installed and a signal input unit 59 for processing signals that are acquired from TV broadcast waves received at an antenna (not shown) based on the control of the CPU 51 are also connected to the input-output interface 55.

A drive 60 is connected to the input-output interface 55 if required. A magnetic disc 71, an optical disc 72, a magneto-optical disc 73, a semiconductor memory 74, or the like is appropriately inserted in the drive 60. Computer programs read from the magnetic disc 71, the optical disc 72, the magneto-optical disc 73, or the semiconductor memory 74 are installed in the storage unit 57 as needed.

Figure 3:
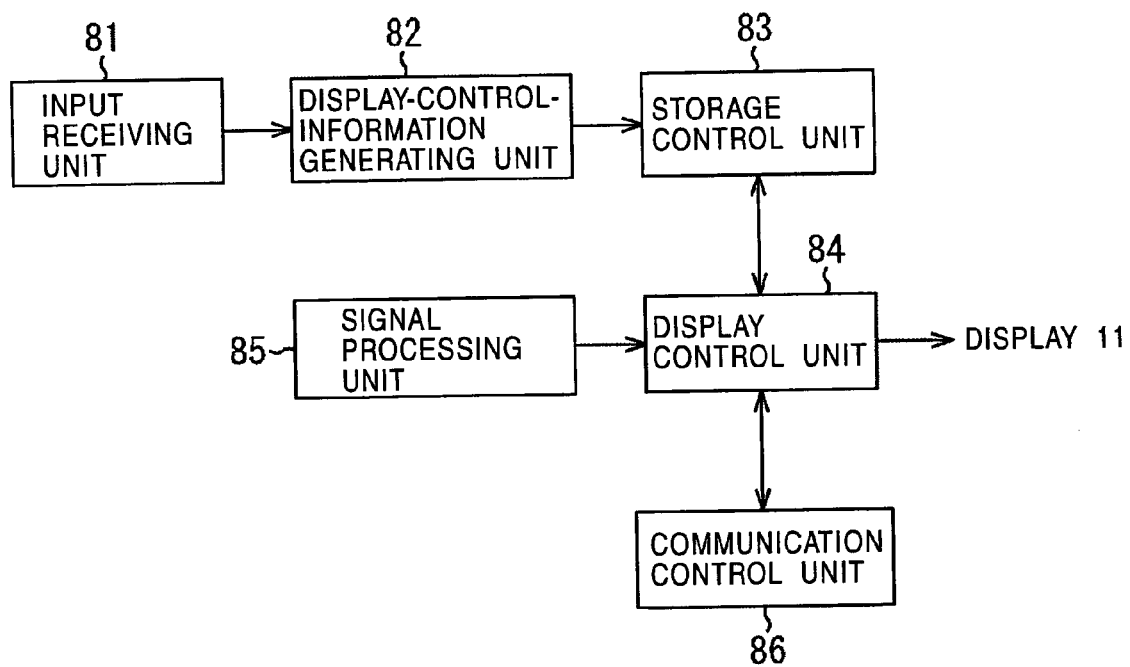
FIG. 3 is a block diagram showing a functional structural example of the display device in FIG. 1.

FIG. 3 is a block diagram showing a functional structural example in which predetermined control programs are executed and realized by the CPU 51 in FIG. 2.

An input receiving unit 81 receives user inputs that are supplied to the input unit 56. In order to display a variety of information on the display device 1, the user must set, for example, the content of information displayed in the areas in the display 11, the display size, and the information concerning the display switching in the areas upon detection of predetermined events (hereinafter referred to as "display control information"). The input unit 56 receives such user settings. The information received in the input receiving unit 81 is supplied to a display-control-information generating unit 82.

The display-control-information generating unit 82 generates the display control information based on the information supplied from the input receiving unit 81. The user sets the display control information in accordance with, for example, wizards displayed in the display 11. Information concerning items that are selected from the menus displayed in the wizards or information that is directly input by the user with a numeric keypad or alphanumeric keys on the remote controller is applied to predetermined forms. The display-control-information generating unit 82 generates the display control information by using such forms.

The display control information generated by the display-control-information generating unit 82 is supplied to a storage control unit 83 that stores the supplied information in, for example, the storage unit 57 in FIG. 2.

A display control unit 84 controls the information display in the display 11 in accordance with the display control information that is stored by the storage control unit 83 as reference information.

For example, the display control unit 84 controls, with reference to the display control information, the display based on the picture information of a TV program that is supplied from a signal processing unit 85 or the display based on the image information, supplied from a communication control unit 86, for displaying the screen of a certain site. Upon detection of a certain event, the display control unit 84 switches the display in the display 11 in accordance with the content of the event. The control of a variety of information by the display control unit 84 will be described below in detail.

The signal processing unit 85 controls the signal input unit 59 to extract the signals of a certain program that is specified by the user from the input signals (signals that are acquired from TV broadcast waves received at an antenna) and to supply the picture information of the TV program to the display control unit 84.

The communication control unit 86 controls the communication unit 58 to supply a variety of information that is acquired through the communication unit 58 to the display control unit 84. The information supplied from the communication control unit 86 includes, for example, image information representing the screen of a certain site, picture information that is photographed by a camera mounted at a remote site and is received by the communication unit 58 over the Internet, and picture information that is photographed by a surveillance camera mounted at an outdoor place and is received by the communication unit 58 over an in-house LAN.

The operation of the display device 1 having the above structure will now be described.

Figure 4:
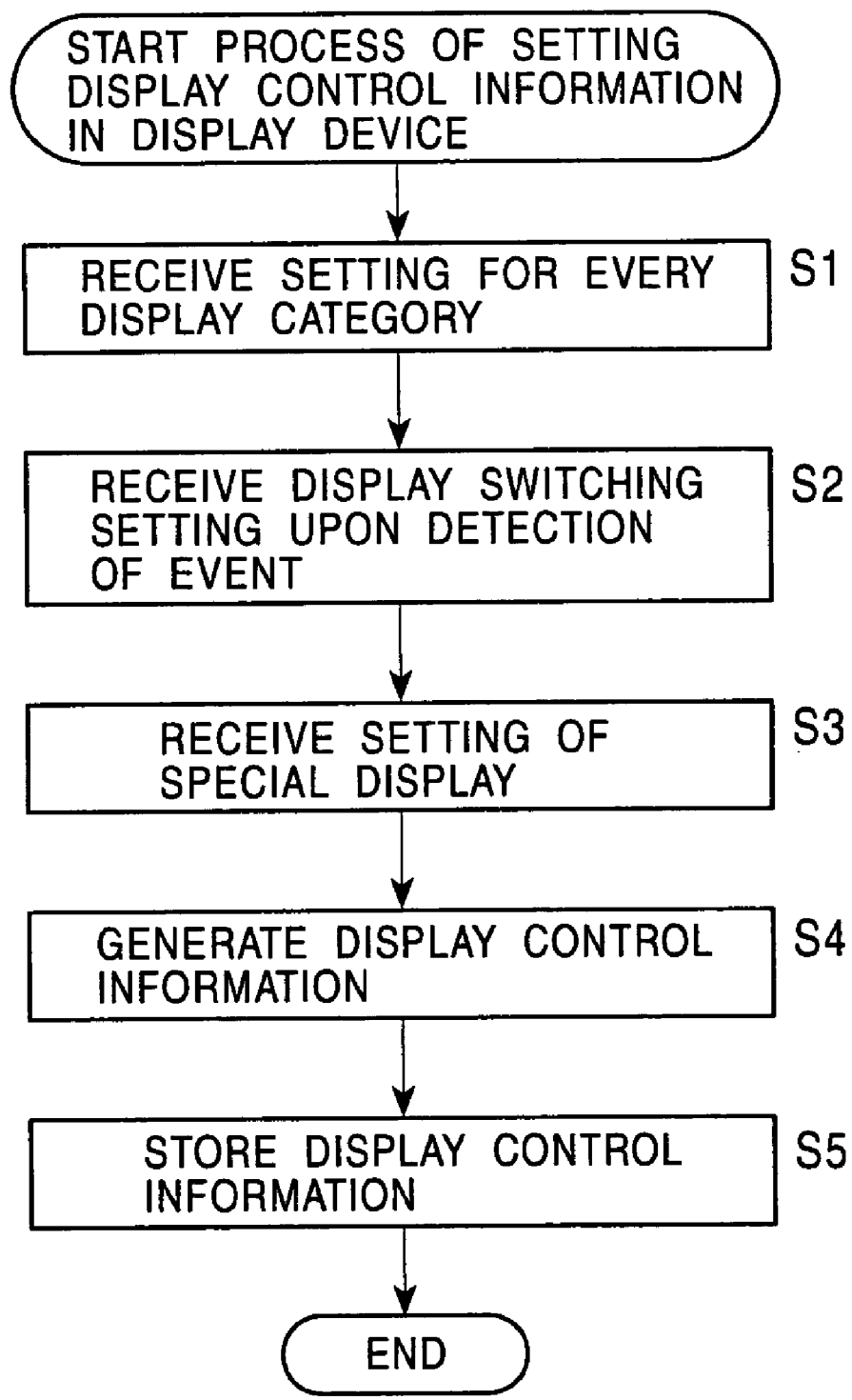
FIG. 4 is a flowchart showing the process of the display device for setting display control information.

FIG. 4 is a flowchart showing the process of the display device 1 for setting the display control information based on user inputs.

In Step S1, the input receiving unit 81 in FIG. 3 receives various settings for every display category based on the user inputs in the input unit 56. That is, the category of information displayed in the display 11 is selected and detailed settings are input in the input receiving unit 81 for every category.

For example, when a TV program acquired from TV broadcast waves is selected as the information category displayed in the display 11 (display category), the settings such as a channel for display are received in the input receiving unit 81. When information of interest downloaded from a certain site over the Internet is selected as the display category, the settings such as the address of the site are received.

When information concerning email, such as the reception or non-reception of email, is selected as the display category, the information concerning the user and the settings for a post office protocol 3 (POP3) server, a simple mail transfer protocol (SMTP) server, or the like are received in the input receiving unit 81. When pictures that are photographed by a camera mounted at a school are selected as the display category, the settings, such as the IP address of a server that distributes the pictures photographed by the camera, are received.

When traffic information acquired from a certain site is selected as the display category, the settings such as the address of the site are received in the input receiving unit 81. When pictures that are photographed by a surveillance camera mounted in the vicinity of a house are selected as the display category, the settings such as the information specifying the position of the surveillance camera are received. When weather information acquired from a certain site is selected as the display category, the settings such as the address of the site are received.

A variety of information, such as the display position, the display size, and the link item, is set for every display category. In Step S2, the display switching setting upon detection of an event is received. In Step S3, the setting for the content of special display is received. Information set by the user will be explained below in detail.

In Step S4, the display control information is generated in the display-control-information generating unit 82 based on the information input by the user. In Step S5, the generated display control information is stored in the storage unit 57 by the storage control unit 83.

FIG. 5 is a table showing examples of the display target and the display setting (examples of the display control information) that are set for every display category described above; that is, the TV program, the information of interest, the email, the situation in a school (pictures photographed by a camera), the traffic information, the pictures photographed by a surveillance camera, and the weather information.

For example, display categories displayed in upper positions have higher priorities. In each category, display targets displayed in leftward positions have higher priorities.

According to FIG. 5, the display category having the highest priority is the TV program and the display category having the lowest priority is the weather information. The program broadcast on "1ch" is the highest-priority display target among "1ch", "2ch", and "3ch" that are selected as the display targets (the content of display) of the TV program.

Accordingly, when the display control information shown in FIG. 5 is set, the program broadcast on "1ch" is displayed in the area 21 (FIG. 1) that is most prone to catch a user's attention, the program broadcast on "2ch" is displayed in the area 22, and the program broadcast on "3ch" is displayed in the area 23. By comparison of the display categories, the weather information having the lowest priority is displayed in the area 35 that is at the lower right corner in the display 11.

In this manner, a display in accordance with the priority of the display category or the display target can be realized. The display categories or the display targets having higher priorities are allocated to the areas that catch a user's attention more in the display 11.

Referring to FIG. 5, since the display setting for the TV program is "display TV program", the content of the received TV program is directly displayed in the corresponding area.

The information of interests that is a display category having the second-highest priority, has "investment information" and "restaurant guide" as the display targets and has "specify uniform resource locator (URL) or display information acquired from source code of URL" as the display setting. Hence, the "investment information" that is acquired from the URL specified by the user is displayed in the area 24 in the display 11 shown in FIG. 1 and the "restaurant guide" is displayed in the area 25 in the display 11.

Similarly, the email sent from "person A" and "person B" is displayed in the subareas 31A and 31B in the display 11 and the display is updated upon reception of new email ("update display upon reception of new email" is set). The pictures that are photographed by cameras mounted at a "classroom" and a "schoolyard", respectively, in a school (nursery) and distributed over the Internet are displayed in the subareas 32A and 32B.

Furthermore, according to the table in FIG. 5, the traffic information concerning a "line A" and the traffic information concerning an "express line B" acquired from a specified URL are displayed in the subareas 33A and 33B. The pictures that are photographed by surveillance cameras mounted at a "front door" and a "back door" are displayed in the subareas 34A and 34B. The weather information in "city A" and "hurricane information" that is acquired over the Internet are displayed in the subareas 35A and 35B.

FIG. 6 is a table showing examples of the display control information concerning the display layout of the display targets in FIG. 5. The display layout information is also set by the user as appropriate.

Referring to FIG. 6, the coordinate values of the center of a frame (area), the area size, and the character font size displayed in the area are set for every display target as information specifying the display layout. When the upper left corner of the display 11 is set to the origin ("0, 0") and the lower right corner of the display 11 is set to the end point ("100, 100"), for example, the coordinate values of the center of an area where a TV program broadcast on "1ch" is displayed is set to "50, 25" and the area size is set to "50".

Similarly, the coordinate values of the center of the area and the area size are set for every display target, and the font size is also set for some display targets.

In this manner, the user can also set the layout of each display target in the display 11 in accordance with his/her preferences. Hence, areas having different positions, sizes, and font sizes are provided in accordance with the user preferences in the display 11.

The display control information shown in FIGS. 5 and 6 is basic information (initial settings) for displaying a variety of information in the display 11. As described above, in addition to the display control information in FIGS. 5 and 6, information for specifying a link item of the displayed information, information for specifying the switching of the display upon occurrence of an event, information for determining the presence or absence of a special display, and so on are set as the display control information.

Figure 7:
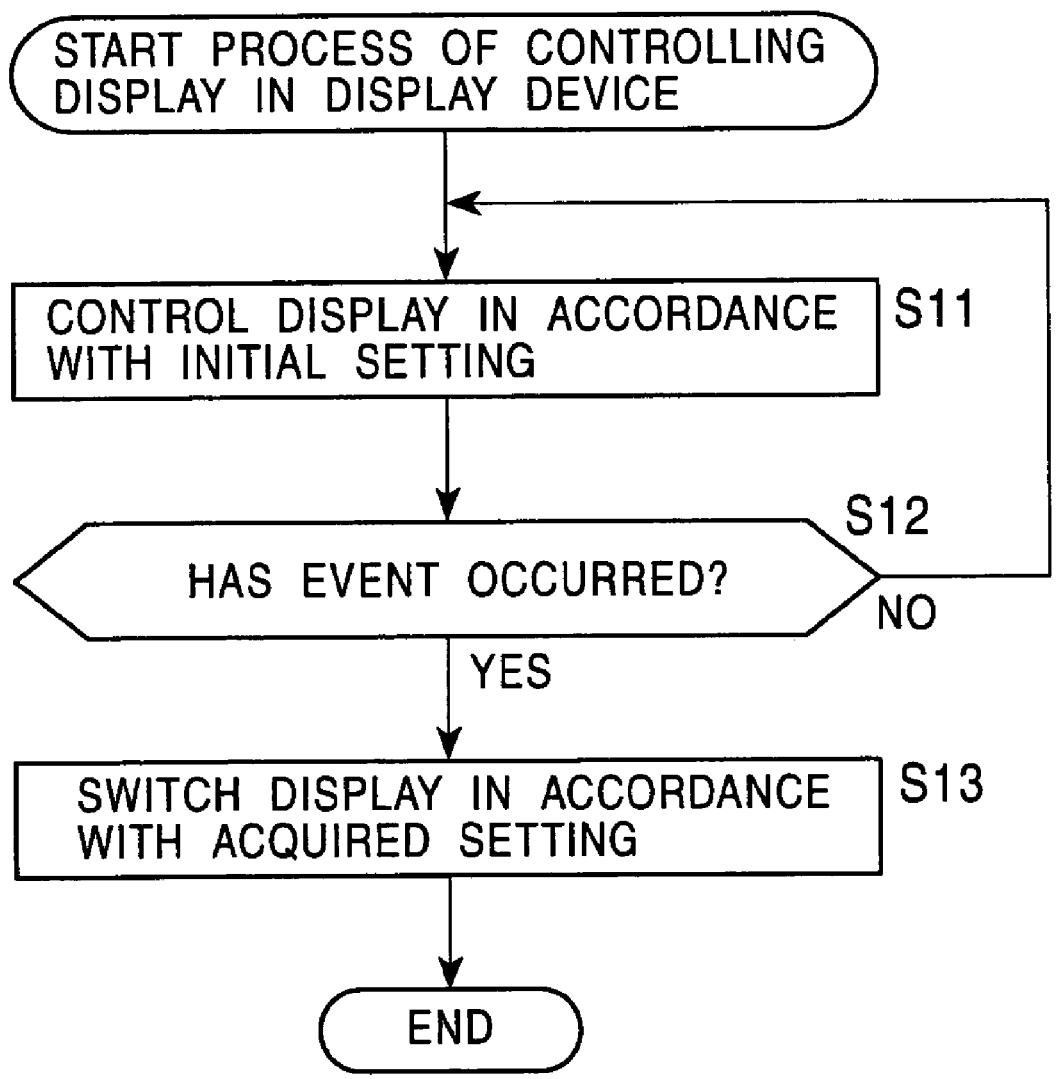
FIG. 7 is a flowchart showing the process of the display device for display control.

FIG. 7 is a flowchart showing the process of display 11 for controlling the display of each area upon occurrence of an event.

In Step S11, the display control unit 84 controls the display in the display 11 in accordance with the initial setting of the display control information that is read from the storage unit 57 by the storage control unit 83. When the display control information shown in FIGS. 5 and 6 is set by the user, the screen in FIG. 1 in accordance with this display control information is displayed.

In Step S12, the display control unit 84 determines whether an event has occurred for the displayed information, based on the output from the signal processing unit 85 or the communication control unit 86, and waits until it determines that an event has occurred. If the display control unit 84 determines that an event has occurred, the display control unit 84 proceeds to Step S13. In Step S13, the display control unit 84 acquires the setting of the display switching upon occurrence of the event from the display control information and controls the display in the display 11 in accordance with the acquired setting.

According to FIG. 8, for example, the display device of Mr. Brown having an IP address of "1192.168.0.255" is set as the link item for the area 24 in FIG. 1. When the link to the display device of Mr. Brown is specified by the user or when the link to the display device of Mr. Brown is requested therefrom, the display control unit 84 links the information displayed in the area 24 in the display 11 to the information displayed in the display device of Mr. Brown through the communication control unit 86 in Step S13. Hence, in this case, the specification of and the request for the link are events.

Figure 9:
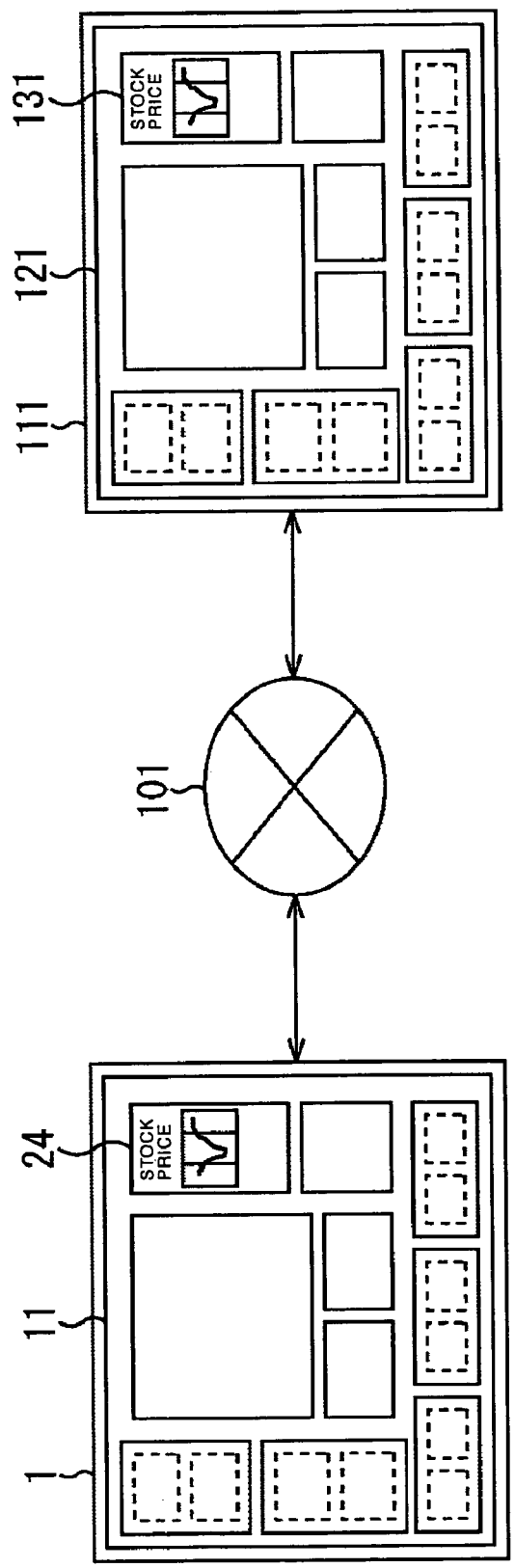
FIG. 9 is a conceptual diagram illustrating the sharing of information.

Referring to FIG. 9, for example, when an area 131 where "investment information" is displayed is provided in a display 121 of a display device 111 (the display device of Mr. Brown), as in the display device 1, the information in the area 24 is linked to the information in the area 131 (the display device 1 and the display device 111 shares the information in the areas 24 and 131 with each other) over a network 101. In other words, after communication is established between the communication unit 58 and the display device 111 when the communication control unit 86 controls the communication unit 58, the information displayed in the area 24 is synchronized with the information displayed in the area 131.

As described above, linking the display in a certain area to the display in another area that is provided on another display device allows the users of the respective display devices to share the information with each other.

Information other than the "investment information" in FIG. 9 is also linked to the display of another display device depending on the setting. Although no information is displayed in areas other than the areas 24 and 131 for simple description on the screens of the display device 1 and the display device 111 in FIG. 9, certain information is actually displayed in each area in accordance with the setting of the display control information, as in the screen shown in FIG. 1. The same is true for FIGS. 11, 12, 13, 16, and 17 described below.

FIG. 10 is a table showing examples of the display control information that represents event conditions (content) set for every display category and display-switching settings (layout change) upon occurrence of an event.

Referring to FIG. 10, when shouting (the sound volume exceeding a certain threshold value) is detected as an event in the TV program that is broadcast on "1ch", the display of the TV program is set to be enlarged to the full size of the variable area 11A.

Accordingly, when the sound volume exceeding a certain threshold value is detected in the TV program displayed in the area 21 in FIG. 1 (the TV program broadcast on "1ch"), the display control unit 84 enlarges the area 21 to the full size of the variable area 11A in Step S13 in FIG. 7. The display on the display device 1 at this time is shown in FIG. 11.

Figure 11:
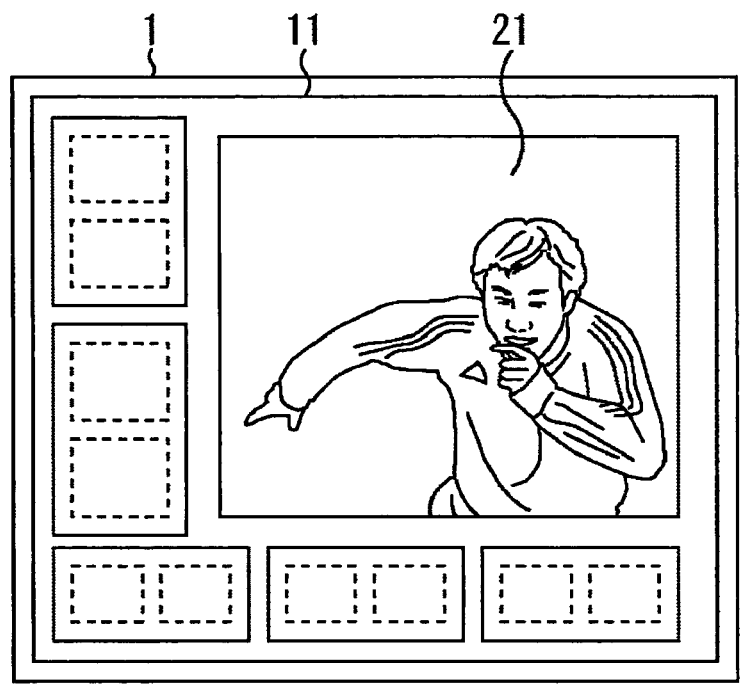
FIG. 11 is a diagram showing a display example on the display device.

Since it is anticipated that the scene represents a climatic moment when relatively higher sound volume is detected in a TV program, displaying the corresponding TV program that is enlarged, as in FIG. 11, allows the user to surely watch the scene even when a plurality of programs are simultaneously displayed.

According to FIG. 10, when email (a mail including an image) is received, the information concerning the email in the area 31 is set to be replaced with the picture of the TV program in the area 22. Hence, when email is received as an event in the subarea 31A, the information concerning the email is displayed in the area 22 and the picture of the TV program that has been displayed in the area 22 is displayed in the subarea 31A, as shown in FIG. 12.

As described above, displaying the information to attract a user's attention in the middle of the display 11 allows the information to be surely presented to the user.

Figure 12:
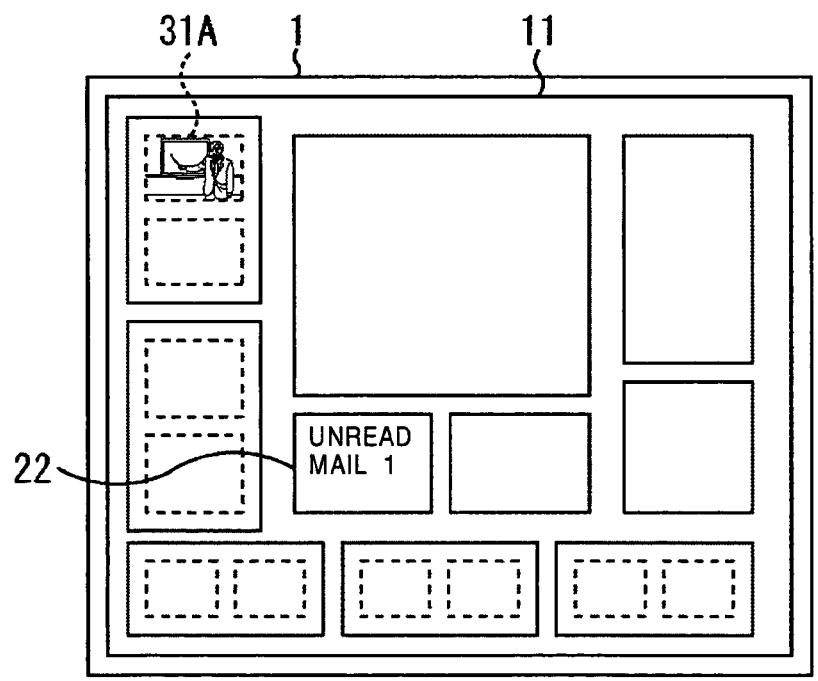
FIG. 12 is a diagram showing another display example on the display device.

A message "unread mail 1" indicating that a piece of email has been received is displayed in the area 22 in FIG. 12.

Figure 13:
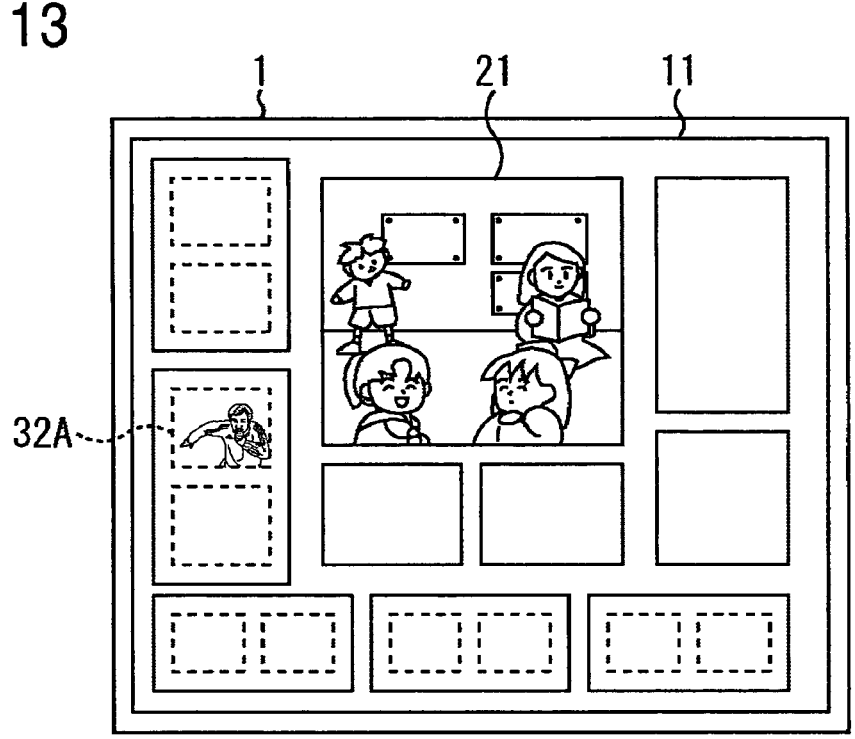
FIG. 13 is a diagram showing another display example on the display device.

According to FIG. 10, when it is time for children to have lunch, the picture in the school displayed in the area 32 is set to be replaced with the picture of the TV program displayed in the area 21. Hence, when lunchtime occurs, the picture in the subarea 32A is replaced with the picture in the area 21, as shown in FIG. 13.

Figure 14:
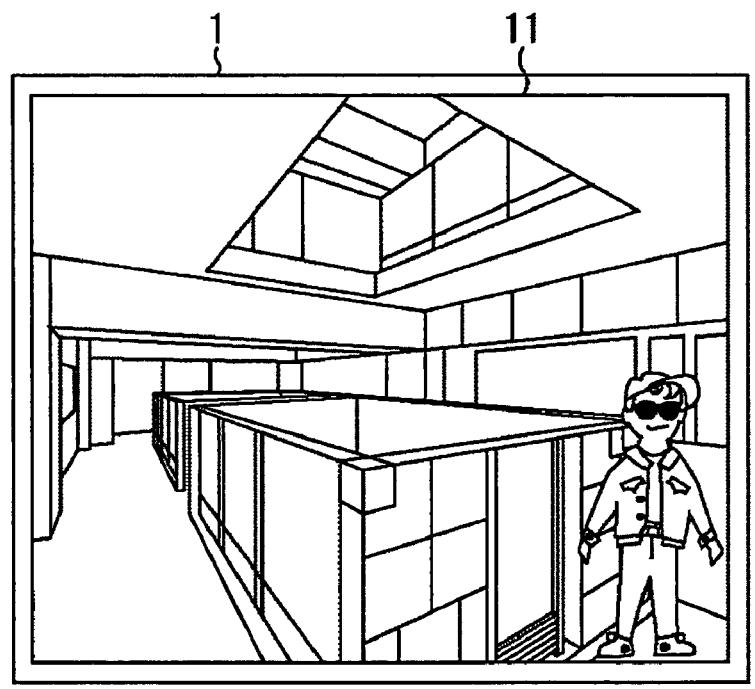
FIG. 14 is a diagram showing another display example on the display device.

Furthermore, according to FIG. 10, it is possible to set the picture photographed by the surveillance camera to be enlarged to the full size of the display 11 when a suspicious person is detected by the surveillance camera as an event. Upon detection of a suspicious person by the surveillance camera, the display on the display device 1 is shown in FIG. 14.

As described above, since the display position and the display size of a variety of information can be switched in response to an occurrence of an event, the user can be made aware of the information that is important to him.

It is also possible that computer graphics (CGs) including a character and the like may be displayed in the display 11 by setting the display control information so that occurrences of various events are presented by using this character.

FIG. 15 is a table showing examples of the display control information concerning the display of the CGs. Referring to FIG. 15, when the CG display is available for the TV program (when "handling in CG application" is set in the CG representation column), for example, the information in which the pictures of the TV program are combined with the CGs is displayed as the program information, as shown in FIG. 16.

Figure 16:
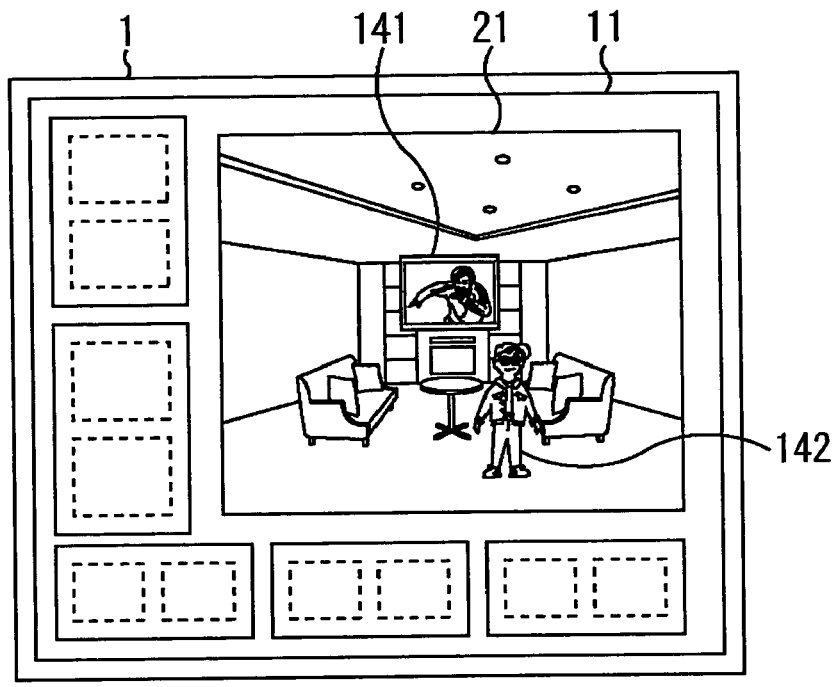
FIG. 16 is a diagram showing another display example on the display device.

Referring to FIG. 16, the area 21 is enlarged to the full size of the variable area 11A and a CG picture representing a living room is displayed in the enlarged area 21. A television-receiver screen 141 and a character 142 who is watching the TV program displayed in the television-receiver screen 141 are displayed in the living room in the area 21. The picture of the TV program displayed in the television-receiver screen 141 is the picture of the TV program that is selected by the user.

When a sound volume exceeding a predetermined threshold is detected as an event in the TV program displayed in the television-receiver screen 141, the character 142 performs an action in connection with the event. For example, when the picture of a football match is displayed in the television-receiver screen 141 and a sound volume exceeding a predetermined threshold is detected in a scene where a score has been made, the character 142 takes an action that expresses his delight.

Presenting the occurrence of an event to the user with an action taken by a displayed character or the like in this manner allows the overall display in the display 11 to afford entertainment.

Figure 17:
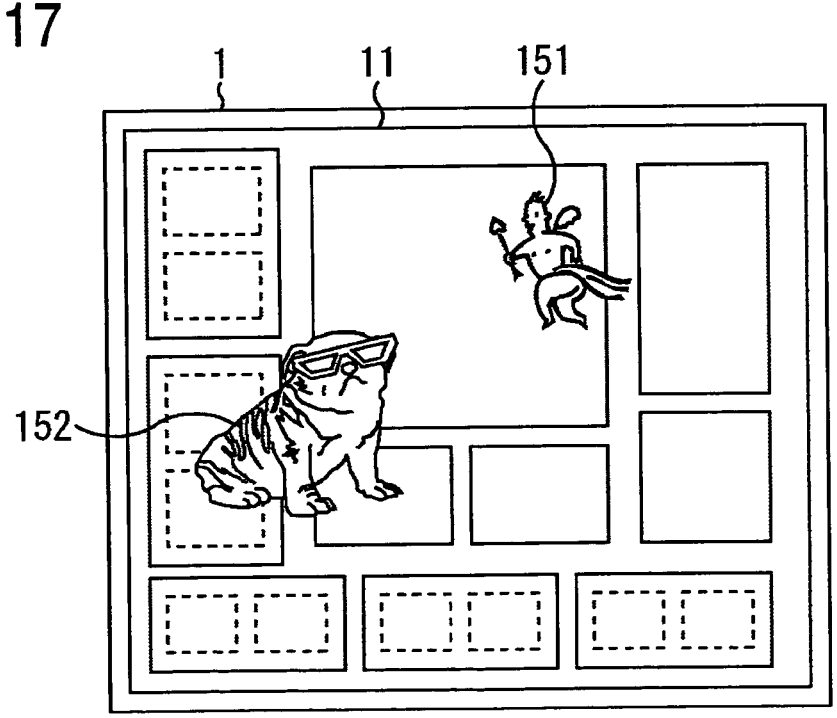
FIG. 17 is a diagram showing another display example on the display device.

As shown in FIG. 17, a character 151 and a character 152 that are displayed in the display 11 may directly present an occurrence of an event, instead of presenting an occurrence of an event with an action taken by the character 141 as in FIG. 16. In this case, for example, the user is informed of the reception of email through the voice of the character 151.

Referring to FIG. 15, "full-time display" shown in the display setting column represents the setting in which the CG such as a character is always displayed and "part-time display" represents the setting in which the CG is displayed at a predetermined time, for example, upon occurrence of an event. "Automatic screen" represents the setting in which a character autonomously takes various actions without user operation.

Although the case in which the display device 1 is installed at home (in a house) has been mainly described above, the display device 1 may be installed in various places, such as a school (university), an office, a store (department store), or a hospital (general hospital), as shown in FIG. 18.

Referring to FIG. 18, for example, when the display device 1 is installed in a house (at home), local information, weather information, school information, information concerning a bulletin in the neighborhood, information concerning the user's community, traffic information, security information, information of interest, TV program information, and/or email information are displayed in the display device 1. When the display device 1 is installed in a school, a notice from an instructor, a notice from the secretariat, a notice from a club, weather information, traffic information, refectory information, and/or advertisement information issued from a neighboring store are displayed in the display device 1.

Similarly, examples of information displayed in the display device 1 when the display device 1 is installed in an office, a store, and a hospital are shown in FIG. 18.

Although the display of the display device 1 is controlled based on one piece of display control information in the above description, the setting of the display control information that is referred to may be switched to another one according to a time of day when multiple pieces of display control information are registered.

Figure 19:
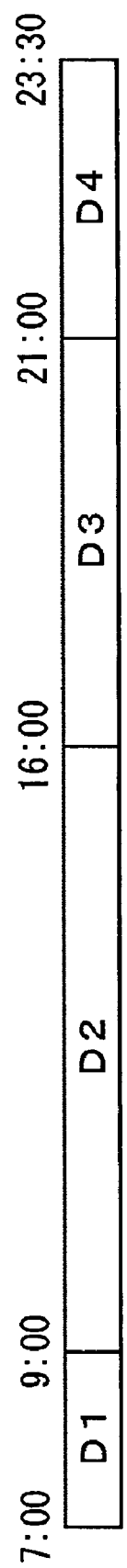
FIG. 19 is a diagram showing a case where the setting of the display control information is switched

FIG. 19 is a diagram showing a case where the setting of the display control information is switched according to the time of day.

In this case, display control information D1 is set during the time period from 7:00 to 9:00, display control information D2 is set during the time period from 9:00 to 16:00, display control information D3 is set during the time period from 16:00 to 21:00, and display control information D4 is set during the time period from 21:00 to 23:30.

Switching the setting of the display control information according to the time of day permits the optimum display for every time period in accordance with the user of the display device 1.

For example, when the display device 1 is installed in a house, the display control information D1 in FIG. 19 is display control information targeted at the whole family (display control information for displaying information that is optimal for whole family) and the display control information D2 is display control information targeted at the mother who most frequently uses the display device 1 in the house during the time period from 9:00 to 16:00. The display control information D3 is display control information targeted at the children who most frequently use the display device 1 in the house during the time period from 16:00 to 21:00 and the display control information D4 is display control information targeted at the parents who most frequently use the display device 1 in the house during the time period from 21:00 to 23:30.

The display control information described above can be transferred from the display device 1 to another device having a display through, for example, an information processing system described below.

Figure 20:
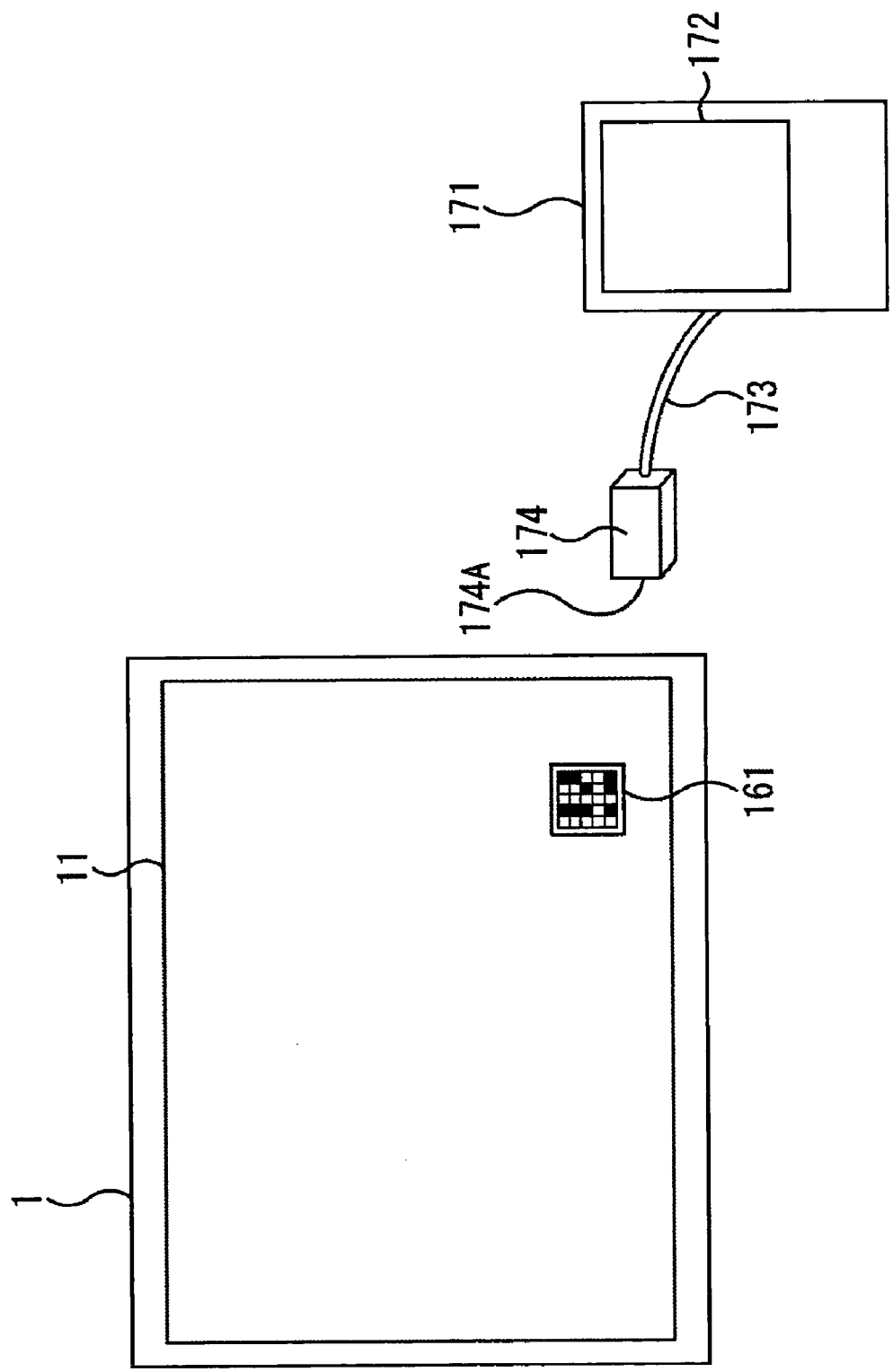
FIG. 20 is a diagram showing a structural example of an information processing system.

FIG. 20 is a diagram showing a structural example of an information processing system that transmits and receives a variety of information including the display control information.

A symbol 161 at the lower right corner of the display 11 is a graphic image (two-dimensional code in a matrix form) that represents the display control information. The black-and-white pattern in the symbol 161 is varied, for example, every time one frame is displayed in the display 11. Specifically, when the display control information is transferred to an external device, the display device 1 generates a symbol array including a plurality of symbols (two-dimensional codes) that represents the display control information and sequentially displays the corresponding symbol every time one frame is displayed.

Hence, a device provided with a reader that is capable of detecting the symbol by detecting the displayed symbol and analyzing it can acquire the display control information through the symbol displayed in the display 11.

An information processing terminal 171 is, for example, a personal digital assistant (PDA), a personal computer, or a mobile phone. A reader/writer 174 that can read the symbol displayed in the display device 1 through a cable 173 is connected to the information processing terminal 171. When a leading edge 174A of the reader/writer 174 is in contact with the symbol 161 displayed in the display 11, the reader/writer 174 reads the symbol 161 in the display 11.

Namely, the reader/writer 174 continuously detects the pattern of the symbol 161 displayed in accordance with the display period of the display 11 during a certain time period. The data concerning the symbol that is detected by the reader/writer 174 is supplied to the information processing terminal 171 through the cable 173.

The information processing terminal 171 acquires the symbol array in which a plurality of symbols are arranged in time series based on the data supplied from the reader/writer 174 and acquires the display control information from the acquired symbol array. The display control information set in the display 11 is transferred from the display device 1 to the information processing terminal 171 through the symbols 161 in this manner.

For example, when the symbols are sequentially displayed at a frequency of 60 Hz by a digital progressive method and one symbol represents data of 2 KB (byte), the data transfer rate is 960 Kbps (60 (times/second)×2 (KB)×8 (bit)). Additionally, displays or the like that can display high-definition pictures at a frequency of 400 Hz have been developed in recent years. When the symbols, each representing data of 2 KB, are sequentially displayed for such a very short period, the data transfer rate is 6,400 Kbps (400 (times/second)×2 (KB)×8 (bit)).

In other words, even without a so-called wireless LAN, such as IEEE (Institute of Electrical and Electronics Engineers) 802.11a or 802.11b, or radio communication, such as Bluetooth, data can be transmitted and received at a relatively high transfer rate.

The amount of data represented by one symbol can be appropriately varied in accordance with the size of a symbol or an adopted error correction method. The data transfer rate can also be appropriately varied in accordance with the amount of data represented by one symbol and the display frequency of the display 11.

The information processing terminal 171 stores the display control information supplied from the display device 1 through the symbol 161 in its internal storage unit 172.

Hence, the user can capture the display control information from the display device 1 to the information processing terminal 171 with a highly intuitive operation, such as bringing the leading edge 174A of the reader/writer 174 into contact with the displayed symbol 161.

The user can input a variety of information including the display control information from the information processing terminal 171 to the display device 1, contrary to the above, by bringing the leading edge 174A of the reader/writer 174 into contact with a read area provided at a certain position on the display 11.

Figure 21:
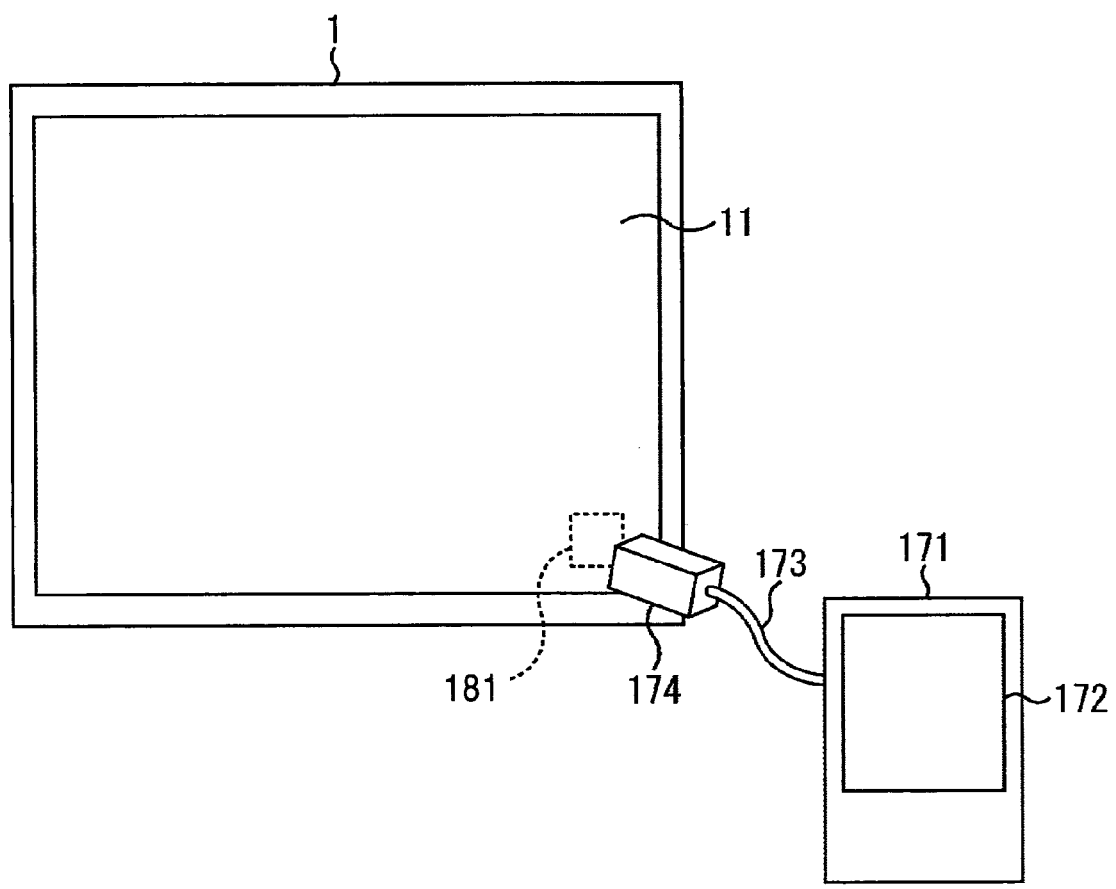
FIG. 21 is a diagram showing another structural example of the information processing system.

For example, as shown in FIG. 21, the display control information is transferred through a symbol from the reader/writer 174 that is in contact with a read area 181 provided at the lower right corner of the display 11 by the display device 1.

A detailed description will be given below. A positive bias voltage is applied to a TFT that is provided for every pixel in the display 11 for displaying parts of a certain image with the corresponding pixels. In contrast, a reverse bias voltage is applied to the TFT for detecting the symbol output from the reader/writer 174 with the corresponding pixels. Accordingly, for example, a plurality of pixels to which the reverse bias voltage is applied, among the pixels in the display 11, constitutes the read area 181.

When outside light is incident on the pixel (TFT) to which the reverse bias voltage is applied (when the light that represents the black-and-white pattern of the symbol is received from the reader/writer 174), a leakage current is detected in an active semiconductor layer in the TFT. Hence, the presence of light incident on each pixel from outside is determined based on whether the leakage current is detected in each of the pixels constituting the read area 181.

In other words, when light corresponding to the symbol is incident on the read area 181 from the reader/writer 174, the black-and-white pattern of the symbol is detected in each of the pixels constituting the read area 181.

Specifically, in the symbols displayed in the reader/writer 174, a leakage current does not occur in the pixels, in the read area 181, with which the black parts of the symbol are in contact; while a leakage current occurs in the pixels, in the read area 181, with which the white parts of the symbol are in contact and the leakage current is detected there.

The detected results in the pixels in the read area 181 are synthesized and one symbol that is displayed in the reader/writer 174 is acquired by the display device 1. Repeating the synthesis and acquisition during a certain period causes the symbols array (all the symbols representing the display control information) displayed in the reader/writer 174 to be captured into the display device 1. In the display device 1, the display control information is restored and acquired by analyzing the symbol array.

In this manner, the user can capture a variety of information including the display control information from the display device 1 to the information processing terminal 171 only by bringing the reader/writer 174 into contact with the symbol 161 displayed in the display 11. The user can also transfer a variety of information, including the display control information, which is selected in the information processing terminal 171, to the display device 1 only by bringing the reader/writer 174 into contact with the read area 181.

Although the read area 181 provided in the display 11 is shown by broken lines in the example in FIG. 21, a frame image having a certain size, in which the read area 181 is formed, may be displayed in the display 11 so that the user can visualize the read area 181.

Although no image is displayed in areas other than the read area 181 in the display 11 in the example shown in FIG. 21, various images such as pictures of a TV program can be displayed in the areas other than the read area 181, as shown in FIG. 1, because a reverse bias voltage is applied to only pixels constituting the read area 181.

Furthermore, although a case in which the display control information is transferred from the information processing terminal 171 to the display device 1 is shown in FIG. 21, the display control information captured from the display device 1 to the information processing terminal 171 may be transferred to another display device having a display in the same manner.

Figure 22:
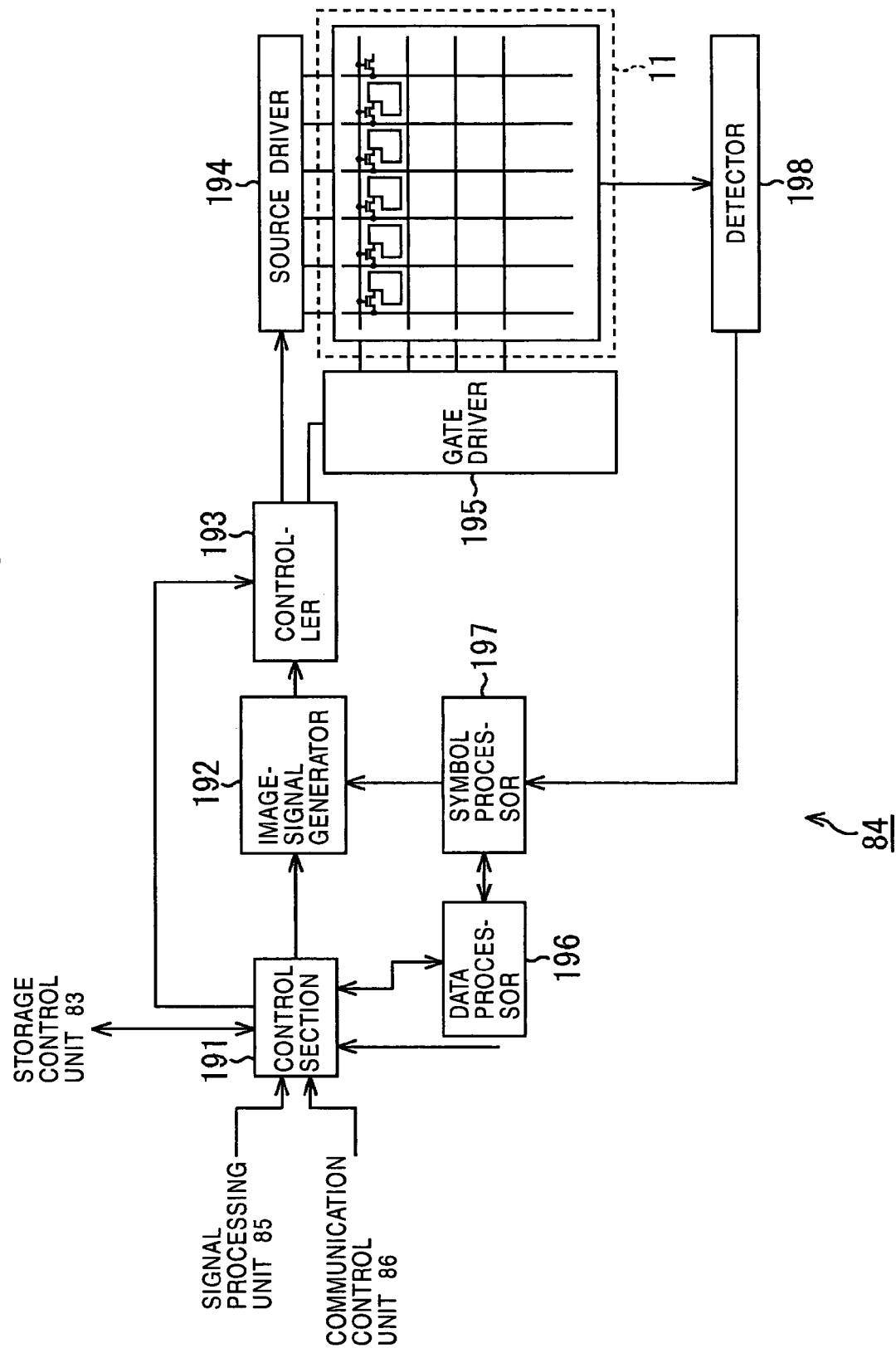
FIG. 22 is a block diagram showing a detailed structural example of a display control unit in FIG. 3.

FIG. 22 is a block diagram showing a structural example of the display control unit 84 in FIG. 3 when the display control information is transmitted and received through a symbol in the above manner.

A control section 191 controls the overall operation of the display control unit 84. For example, the control section 191 refers to the display control information read out from the storage control unit 83 to display the pictures of a TV program broadcast on a certain channel based on the output from the signal processing unit 85 or to display the screen of a certain site based on the output from the communication control unit 86.

An image-signal generator 192 generates image signals for displaying the images corresponding to the data that is supplied from the control section 191 and supplies the generated image signals to a controller 193 for controlling the drive of the display 11.

The image-signal generator 192 also generates image signals, for example, for displaying one symbol for every screen (each time one frame is displayed) based on the data that is generated and supplied by a symbol processor 197 and supplies the generated image signals to the controller 193.

The controller 193 controls the drive of a gate driver 195 that controls the voltage applied to gate electrodes of TFTs that are provided for the respective pixels in the display 11 and the drive of a source driver 194 that controls the voltage between source electrodes and the gate electrodes of the TFTs in conjunction with the drive of the gate driver 195.

For example, the controller 193 controls the gate driver 195 such that a reverse bias voltage is applied to the TFTs of the pixels constituting a read area when the control section 191 instructs that the read area is to be formed at a certain position in the display 11 and such that a positive bias voltage is applied to areas other than the read area.

Hence, the gates are turned off in the pixels constituting the read area and a leakage current corresponding to the light from outside is generated, as described above, thus allowing the pattern of the symbols output from the reader/writer 174 to be detected. The gates are turned on in pixels other than the pixels constituting the read area. A current corresponding to the voltage that is supplied from the source driver 194 causes the electroluminescence (EL) elements connected to pixel electrodes to emit light and therefore part of the image is displayed.

The operation of the TFTs that are provided for every pixel in the display 11 will now be described in detail with reference to FIGS. 23 and 24.

Figure 23:
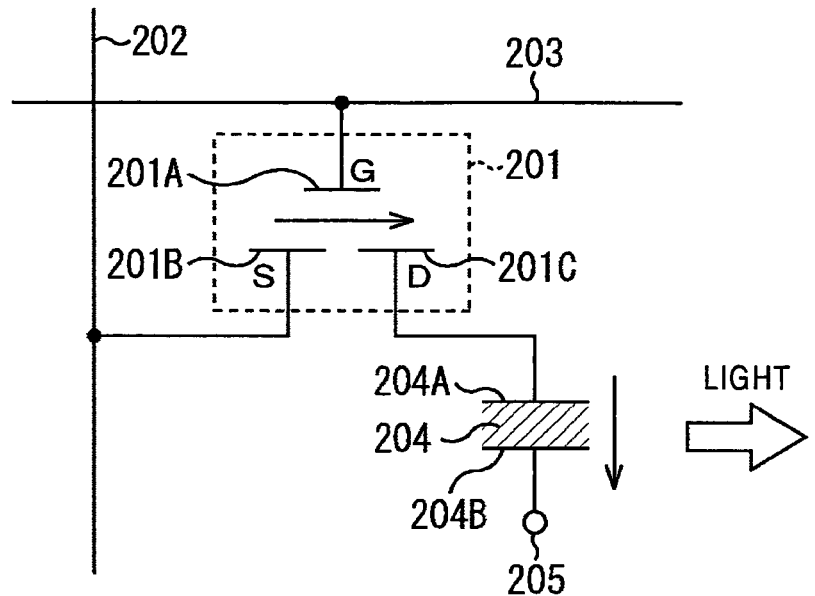
FIG. 23 is a diagram showing a pixel included in a display in FIG. 1 in detail.

Referring to FIG. 23, one pixel in the display 11 that is controlled by the controller 193 is shown as a pixel that displays an image (a pixel other than the pixels constituting the read area for a symbol).

For example, when a positive voltage is applied from a gate line 203 to a gate electrode 201A (G) of a TFT 201 by the gate driver 195 and the gate electrode 201A is turned on, a current flows from a source electrode 201B (S) to a drain electrode 201C (D) in an active semiconductor layer (channel) made of amorphous silicon or polysilicon in accordance with a voltage applied from the source driver 194 through a source line 202, as shown by a solid right arrow.

An anode 204A of an EL element 204 is connected to the drain electrode 201C of the TFT 201. When a current supplied from the drain electrode 201C flows through the EL element 204 toward a counter electrode 205, the EL element 204 emits light in accordance with the current.

The light emitted from the EL element 204 is transmitted through the surface of the display 11 and is emitted from the display device 1, and the pixel shown in FIG. 23 causes part of the image to be displayed. Referring to FIG. 23, although the light is emitted rightward from the EL element 204 for convenience, as shown by an outlined arrow, the light from the EL element 204 is actually transmitted through a transparent electrode that is either the anode 204A or a cathode 204B and is emitted from the display device 1.

In contrast, when a reverse voltage is applied to the gate electrode 201A (G) of the TFT 201 by the gate driver 195 and the gate electrode 201A is turned off, no current flows through the active semiconductor layer even if a voltage is applied by the source driver 194. As a result, the EL element 204 does not emit light because no current flows through the EL element 204. When light is incident on the display device 1 in this condition, as shown by outlined arrows in FIG. 24, a small amount of leakage current (off-state current) flows from the drain electrode 201C to the source electrode 201B owing to the photoconductivity of the active semiconductor layer of the TFT 201. The EL element 204 generates a reverse current without light emission by itself when the EL element 204 is irradiated with light with a reverse voltage being applied.

Figure 24:
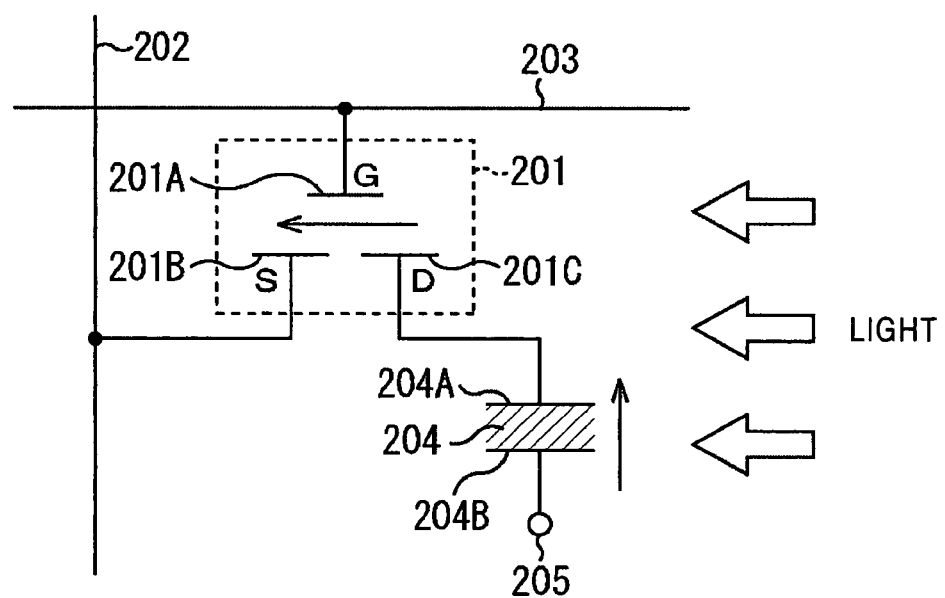
FIG. 24 is another diagram showing a pixel included in the display in FIG. 1 in detail.

The detection of the current generated in this manner causes the outside light that is incident on the pixel in FIG. 24, that is, the white area of a symbol that is displayed at a position, corresponding to the pixel in FIG. 24, in the areas where the symbol is displayed in the reader/writer 174 (at the front of the pixel in FIG. 24) to be detected.

Figure 25:
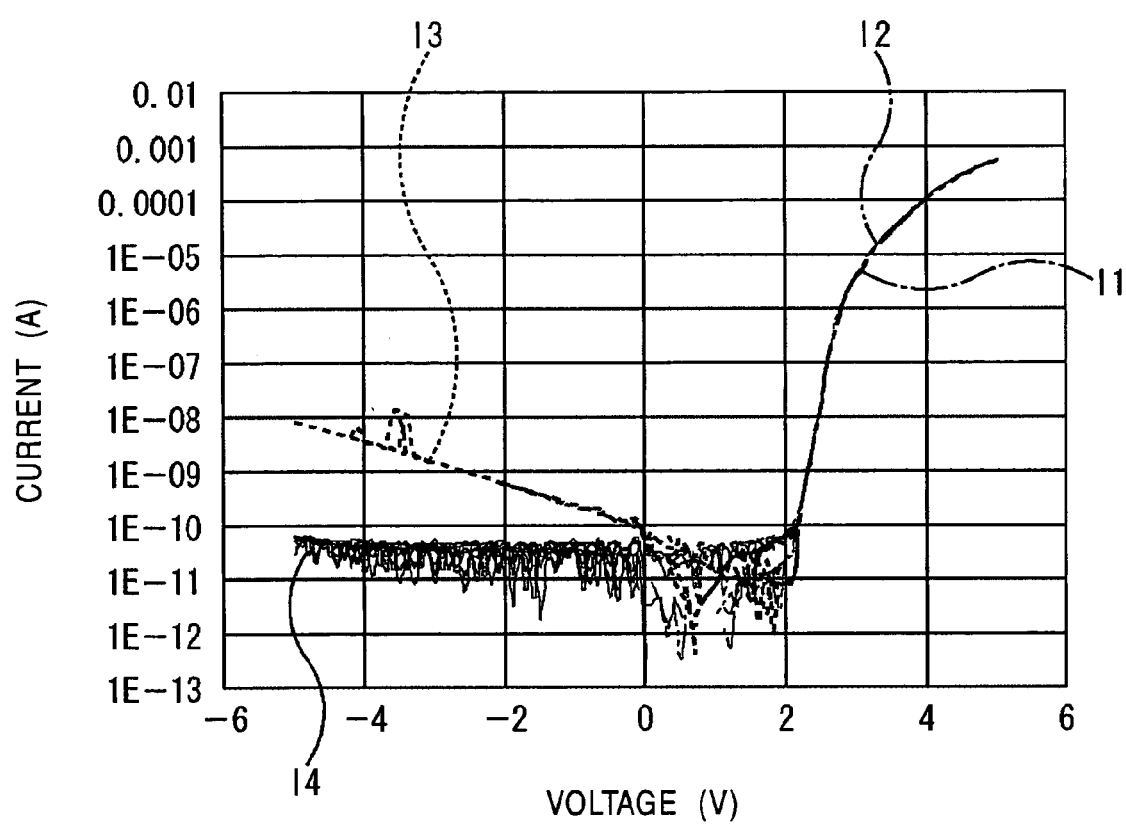
FIG. 25 is a graph showing the measurement results of current generated in the pixels shown in FIGS. 23 and 24.

FIG. 25 is a graph showing the measurement results of current generated in the pixels shown in FIGS. 23 and 24. Referring to FIG. 25, the horizontal axis represents the voltage applied to the gate electrode 201A and the vertical axis represents the current flowing through the pixel.

A measurement result 11 shows the current flowing through the channel when the pixel is irradiated with light with a positive voltage being applied. A measurement result 12 shows the current flowing through the channel when the pixel is not irradiated with light with a positive voltage being applied.

The measurement results 11 and 12 show that a current flows depending on the voltage that is applied by the source driver 194 with a positive voltage being applied, regardless of the presence or absence of light from outside. In other words, the pixel to be measured causes part of the image to be displayed in these cases.

A measurement result 13 in FIG. 25 shows the leakage current generated in the pixel when the pixel is irradiated with outside light with a reverse voltage being applied. The measurement result 13 apparently differs from a measurement result 14 that shows the leakage current generated in the pixel when the pixel is not irradiated with outside light with a reverse voltage being applied.

For example, when the pixel is irradiated with a certain amount of outside light with a voltage of about −5 V (a reverse voltage) being applied, a current of around "1E-8(A)" (the sum of a current generated in the active semiconductor layer of the TFT and a current generated by the EL element) is generated.

Hence, it is determined whether the pixel has been irradiated with light based on whether the current detected in the pixel to which a reverse bias voltage is applied exceeds a certain threshold value. In practice, the signals shown in FIG. 25 are amplified and the presence or absence of the light irradiation of the pixel is determined from the amplified signals.

Referring to FIG. 25, the measurement result 14 shows that a small amount of current, around "1E-10(A)", is generated even if the pixel is not irradiated with outside light. This current is caused by noise during measurement. Much the same measurement results are attained as those in FIG. 25, regardless of the color of light (RGB) that the corresponding EL element emits.

Although one TFT is provided for one pixel in the examples shown in FIGS. 23 and 24, it is possible to detect the symbol input from an external device based on a leakage current generated in each TFT even in 2-TFT pixels each having two TFTs or 4-TFT pixels each having four TFTs.

When the display 11 is an LCD (the display 11 is not a display that is provided with the EL element 204 and emits white light), a liquid crystal is provided at the position of the EL element 204 in FIGS. 23 and 24 to from a pixel. In this case, since no current is generated in the liquid crystal, unlike the EL element 204, even when the pixel is irradiated with outside light with a reverse bias voltage being applied, the black-and-white pattern of the symbol is detected based only on a leakage current generated in the TFT that is provided for the corresponding pixel.

Referring back to FIG. 22, a detector 198 detects a current generated in the pixel to which a reverse bias voltage is applied as described above, and supplies the detected results to the symbol processor 197.

The symbol processor 197 synthesizes the detected results for the pixels constituting the read area based on the output from the detector 198 and acquires the symbol output from the reader/writer 174.

Repeating the process of detecting the symbol during a certain period (during the period necessary for transferring the source data) allows the symbol processor 197 to acquire the symbol array as shown in FIG. 26.

Referring to FIG. 26, symbols S1 to S3 each having a simple pattern are symbols for synchronization during detection. A variety of information including the display control information is represented with symbols S4 to Sn.

The symbol array that is acquired by the symbol processor 197, as shown in FIG. 26, is supplied to a data processor 196.

The symbol processor 197 displays the symbol at a certain position on the display 11 and generates the symbol array based on the data supplied from the data processor 196 upon transfer of the data to the information processing terminal 171. The data of the symbol array generated by the symbol processor 197 is supplied to the image-signal generator 192. For example, when the symbol array in FIG. 26 is generated by the symbol processor 197, the symbols S1 to Sn is sequentially displayed on the display 11 each time one frame is displayed.

The data processor 196 appropriately conducts a scramble process, appending of error correction blocks, a modulation process, and so on for the source data that is acquired and supplied by the control section 191 (the display control information to be transferred to the information processing terminal 171) when it displays the symbol on the display 11, and supplies the processed data to the symbol processor 197.

When the data representing the symbol that is detected in the read area on the display 11 is supplied from the symbol processor 197, the data processor 196 appropriately conducts a demodulation process, an error-correction process, a descramble process, and so on for the supplied data, and supplies the processed source data (the data transferred from the information processing terminal 171) to the control section 191.

The data, supplied to the control section 191, which is transferred from the information processing terminal 171 is stored in the storage unit 57. Alternatively, the images corresponding to the data are displayed on the display 11 in accordance with the processing in the image-signal generator 192 and the controller 193 that is conducted based on the transferred data.

Since the display device 1 having the structure described above transmits and receives the display control information through the symbols, the user can easily input the display control information that has once been set in a certain display device into another device and can utilize the device in an optimal environment that suits his/her preferences.

A series of the processes described above may be conducted by hardware or by software.

In order to conduct a series of the processes by software, the programs constituting the software are installed in the computer that is incorporated in dedicated hardware or in the computer, such as a general-purpose personal computer, which is capable of executing various functions by the installation of various programs, over a network or from a storage medium.

Such storage media include not only package media that have the magnetic disc 71 (including a flexible disc), the optical disc 72 (including a compact disc-read only memory (CD-ROM) and a digital versatile disc (DVD)), the magneto-optical disc 73 (including a mini-disc (MD) (registered trademark)), and/or the semiconductor memory 74, as shown in FIG. 2, in which the programs are stored and which are delivered, separately from the main unit, for offering the programs to the user, but also a hard disk that is included in the ROM 52 in which the programs are stored or the storage unit 57. The hard disk, which is incorporated in advance in the main unit, is provided to the user.

According to the present invention, the steps describing the program that is stored in a storage medium may be sequentially executed in time series as described above or may be executed in parallel or separately.

What is claimed is:

1. A display device for displaying display information in a display area, the display device comprising:
    a display unit configured to display said display information on the display area;
    means, provided in the display device, for receiving display control information emitted from an information processing terminal through a read area provided in the display area of the display device; and
    a setting unit configured to set the relationship between the display area and the display information based on the received display control information;
    a display control unit configured to control said display unit to display the display information so as to be displayed in the display area, based on the display control information set by the setting unit.

2. A display device according to claim 1, wherein the display control unit controls said display unit to switch display area for displaying said display information.

3. A display device according to claim 1, wherein display control unit controls said display unit to switch the size of said display area.

4. A display device according to claim 1, wherein, the setting unit sets information representing a priority of the display information as the display control information, and wherein the display control unit controls the display unit to display the display information as to be displayed in each of display areas including said display area, based on the information representing the priority.

5. A display device according to claim 1, wherein, the setting unit sets, as the display control information, the information representing a link item that another display device uses to display the display information displayed in the display area.

6. A display device according to claim 1, wherein the display control unit controls said display unit to display a program in said display area, as the display information.

7. A display device according to claim 6, wherein when the display control unit detects sound volume exceeding a predetermined threshold value in the program, the display control unit controls said display unit to present occurrence of an event to a user.

8. A display device according to claim 1, wherein the display control unit controls said display unit to display the information corresponding to e-mail in said display area, as the display information.

9. A display device according to claim 8, wherein when the display control unit detects reception of e-mail, the display control unit controls said display unit to present occurrence of an event to a user.

10. A display device according to claim 1, wherein the display control unit controls said display unit to display a picture from a camera acquired through the Internet in said predetermined display area, as the display information.

11. A display device according to claim 10, wherein when the display control unit detects a person in said picture, the display control unit controls said display unit to present occurrence of an event to a user.

12. A display device according to claim 1, wherein, the display control unit controls said display unit to display a weather information in said predetermined display area, as the display information.

13. A display device according to claim 1, wherein, the display control unit controls said display unit to display an information concerning the user's community in said predetermined display area, as the display information.

14. A display device according to claim 1, wherein, the display control unit controls said display unit to display a to-do list in said predetermined display area, as the display information.

15. A display device according to claim 1, wherein, the display control unit controls said display unit to display a schedule in said predetermined display area, as the display information.

16. A display device according to claim 1, wherein, the display control unit controls said display unit to display an advertisement in said predetermined display area, as the display information.

17. A display method of a display device that is capable of displaying display information in a display area of a display unit, the display method comprising the steps of:
    receiving display control information emitted from an information processing terminal through a read area provided in the display area of the display device; and
    setting the relationship between the display area and the display information based on the received display control information.

18. A storage medium for storing a computer-readable program to be executed by a computer to carry out processing, wherein said program is a display processing that is capable of displaying display information in a display area of a display unit, said program comprising the steps of:

receiving display control information emitted from an information processing terminal through a read area provided in the display area of the display device; and setting the relationship between the display area and the display information, based on the received display control information; and controlling said display unit to display the display information as to be displayed in the display area, based on the display control information set in the setting step.

19. A display method of a display device according to claim 17, further including steps of detecting an event corresponding to said display information displayed in said display device; and controlling said display unit to present the occurrence of the event to the user, when said event is detected in the detecting step.

20. A storage medium for storing a computer-readable program according to claim 18, further including steps of detecting an event corresponding to said display information displayed in said display device; and controlling said display unit to present the occurrence of the event to the user, when said event is detected in the detecting step.

21. A display device for displaying display information in a display area, the display device comprising:

a display unit configured to display said display information;

means for receiving display control information emitted from an information processing terminal through a read area on the display area; and a setting unit configured to set the relationship between the display area and the display information based on the received display control information;

a display control unit configured to control said display unit to display the display information so as to be displayed in the display area, based on the display control information set by the setting unit, wherein the read area on the display unit is made up of thin film transistors, in which a positive bias voltage is applied to every thin film transistor when displaying part of an image, and a reverse bias voltage is applied to every thin film transistor when receiving display control information.

* * * * *